United States Patent
Seguchi et al.

(10) Patent No.: US 7,923,884 B2
(45) Date of Patent: Apr. 12, 2011

(54) ROTARY ELECTRIC MACHINE HAVING STATOR COIL WITH U-SHAPED SEGMENT

(75) Inventors: Masahiro Seguchi, Oobu (JP); Shinji Kouda, Kariya (JP); Tetsuya Gorohata, Anjo (JP)

(73) Assignee: Denso Corporation, Kariya (JP)

( * ) Notice: Subject to any disclaimer, the term of this patent is extended or adjusted under 35 U.S.C. 154(b) by 673 days.

(21) Appl. No.: 11/281,513

(22) Filed: Nov. 18, 2005

(65) Prior Publication Data

US 2006/0103255 A1 May 18, 2006

(30) Foreign Application Priority Data

Nov. 18, 2004 (JP) .................................. 2004-334155

(51) Int. Cl.
*H02K 3/48* (2006.01)
*H02K 3/12* (2006.01)
*H02K 9/00* (2006.01)

(52) U.S. Cl. ........................................ 310/201; 310/180
(58) Field of Classification Search .................. 310/201, 310/179, 180
See application file for complete search history.

(56) References Cited

U.S. PATENT DOCUMENTS

| | | | |
|---|---|---|---|
| 5,955,810 A * | 9/1999 | Umeda et al. | 310/208 |
| 6,252,326 B1 * | 6/2001 | Umeda et al. | 310/179 |
| 6,404,091 B1 * | 6/2002 | Nakamura et al. | 310/179 |
| 6,441,527 B1 | 8/2002 | Taji et al. | |
| 6,762,528 B2 * | 7/2004 | Wada et al. | 310/201 |
| 6,784,583 B2 * | 8/2004 | Umeda | 310/179 |
| 2004/0164637 A1 | 8/2004 | Seguchi | |
| 2006/0006757 A1 | 1/2006 | Seguchi | |
| 2006/0103255 A1 * | 5/2006 | Seguchi et al. | 310/201 |

FOREIGN PATENT DOCUMENTS

| | | |
|---|---|---|
| JP | A 2001-231203 | 8/2001 |
| JP | A 2003-018778 | 1/2003 |
| JP | A 2003-158840 | 5/2003 |
| JP | A 2003-264964 | 9/2003 |
| JP | A-2003-297863 | 10/2003 |
| JP | A-2004-112890 | 4/2004 |
| JP | A-2004-264964 | 9/2004 |
| JP | A 2004-297863 | 10/2004 |

OTHER PUBLICATIONS

Foreign Office Action, dated Apr. 7, 2009 (with English translation).
English-language translation of Japanese Office Action from Japanese Application No. 2004-334155, mailed Jun. 30, 2010.

* cited by examiner

*Primary Examiner* — Karl I Tamai
(74) *Attorney, Agent, or Firm* — Oliff & Berridge, PLC

(57) ABSTRACT

In a stator coil of a rotary electric machine, a first crank portion radially shifts one side of a turn portion from the other side thereof by a first length. The one side extends to one of paired straight portions, and the other side extends to the other thereof. A second crank portion radially shifts one side of a turn portion from the other side thereof by a second length. The one side extends to one of the paired straight portions, and the other side extends to the other thereof. The first length is equivalent to a radial width of the turn portion of the first segment of each set. The second length allows the second crank portion of the second segment of each of the sets to substantially overlay the first crank portion of the first segment of each set.

11 Claims, 16 Drawing Sheets

CIRCUMFERENTIAL DIRECTION

ROTARY ELECTRIC MACHINE HAVING STATOR COIL WITH U-SHAPED SEGMENT

CROSS REFERENCE TO RELATED APPLICATIONS

This application is based on Japanese Patent Application 2004-334155 filed on Nov. 18, 2004. This application claims the benefit of priority from the Japanese Patent Application, so that the descriptions of which are all incorporated herein by reference.

Field Of The Invention

The present invention relates to rotary electric machines installed, for example, in vehicles, such as passenger automobiles and trucks. In addition, the present invention relates to stator coils for rotary electric machines and methods of producing the same.

BACKGROUND OF THE INVENTION

Rotary electrical machines have been required to downsize with high output, especially, to reduce the lengths of stator coil ends of their stators; these stator coil ends project from stator cores of the stators. Rotary electric machines meeting this requirement can be installed in vehicle's engine compartments with their capacities kept unchanged.

In order to meet the requirement, a rotary electric machine needs to reduce the lengths (heights) of stator coil ends of a stator thereof from a stator core of the stator while increasing the winding packing factor of the stator.

An example of conventional rotary electric machines, which installs therein an annular-shaped stator with a sequentially joined-segment stator coil designed to fulfill the need, is disclosed in the Japanese Unexamined Patent Publication No. 2003-18778.

In the rotary electric machine disclosed in the Patent Publication, each conductor segment of a sequentially joined-segment stator coil is made of a U-shaped plate-like conductor and is formed at its substantially middle portion with a crank portion without kinks. The crank portion causes one of both sides of the crank portion in the plate-like conductor to shift from the other thereof by a predetermined length substantially corresponding to a width of the plate-like conductor. This structure of the stator prevents each conductor segment from expanding in radial directions thereof.

The invention disclosed in the Patent Publication is effective in cases where the conductor segments are arrayed in the circumferential direction of the stator core and/or the conductor segments with the same structure are arranged in a radial direction of the stator core.

It is to be considered that the invention disclosed in the Patent Publication is applied to a rotary electric machine with a sequentially joined-segment stator coil in which pairs of different-sized conductor segments are arrayed in the circumferential direction of a stator core such that the different-sized (large-sized and small-sized) conductor segments of each pair are overlapped.

In this application example, however, even if the small-sized conductor segment of each pair is prevented from radially extending, it may be difficult to prevent the large-sized conductor segment of each pair from radially expanding. This radial expansion of the large-sized conductor segment of each pair may cause the coil ends of the stator coil to radially extend.

SUMMARY OF THE INVENTION

The present invention has been made on the background above.

Accordingly, at least one preferable embodiment of the present invention provides a rotary electric machine capable of preventing coil ends of a stator coil thereof from radially expanding.

According to one aspect of the present invention, there is provided a rotary electric machine including a stator core having a plurality of slots circumferentially arranged at given intervals. The circumferential interval of adjacent slots defines a slot pitch. The rotary electric machine includes a stator coil. The stator coil includes a plurality of sets of at least first and second segments each having a substantially U-shape. The second segment is larger than the first segment. Each of the first and second segments includes a pair of straight conductor portions and a turn portion continuously connecting the paired straight conductor portions. One of the paired straight portions of each of the first and second segments of each of the sets is inserted into one of the slots, and the other of the paired straight portions thereof is inserted into another one of the slots such that the second segment overlaying the first segment. The turn portion of the first segment of each of the sets includes a first crank portion. The first crank portion is configured to radially shift one side of the turn portion from the other side thereof by a first length. The one side of the turn portion extends to one of the paired straight portions, and the other side thereof extends to the other of the paired straight portions. The turn portion of the second segment of each of the sets includes a second crank portion. The second crank portion is configured to radially shift one side of the turn portion from the other side thereof by a second length. The one side of the turn portion extends to one of the paired straight portions, and the other side thereof extends to the other thereof. The first length is substantially equivalent to a radial width of the turn portion of the first segment of each of the sets. The second length is determined to allow the second crank portion of the second segment of each of the sets to substantially overlay the first crank portion of the first segment of each of the sets.

According to one aspect of the present invention, there is provided a stator coil for rotary electric machines. The stator coil includes a plurality of sets of at least first and second segments each having a substantially U-shape. The second segment is larger than the first segment. Each of the first and second segments includes a pair of straight conductor portions, and a turn portion continuously connecting the paired straight conductor portions. One of the paired straight portions of each of the first and second segments of each of the sets is to be inserted into one of slots formed in a stator core at predetermined pitches in a circumferential direction thereof. The other of the paired straight portions thereof is to be inserted into another one of the slots of the stator core such that the second segment overlaying the first segment. The turn portion of the first segment of each of the sets includes a first crank portion. The first crank portion is configured to radially shift one side of the turn portion from the other side thereof by a first length. The one side of the turn portion extends to one of the paired straight portions, and the other side thereof extends to the other thereof. The turn portion of the second segment of each of the sets includes a second crank portion. The second crank portion is configured to radial shift one side of the turn portion from the other side thereof by a second length. The one side of the turn portion extends to one of the paired straight portions, and the other side thereof extends to the other of the paired straight portions. The first length is substantially equivalent to a radial width of the turn portion of the first segment of each of the sets. The second length is determined to allow the second crank portion of the second segment of each of the sets to substantially overlay the first crank portion of the first segment of each of the sets.

According to a further aspect of the present invention, there is provided a method of producing a stator coil for rotary electric machines. The stator coil is installed in a plurality of slots of a stator core. The slots are circumferentially arranged at given intervals. The method includes preparing a plurality of sets of at least first and second segments each having a substantially U-shape. The second segment is larger than the first segment. Each of the first and second segments includes a pair of straight conductor portions, and a turn portion continuously connecting the paired straight conductor portions. The method also includes deforming part of the U-shaped turn portion of the first segment of each of the sets in a direction substantially perpendicular to an extending direction of the U-shaped turn portion to form a first crank portion of the first segment of each of the sets at the part of the U-shaped turn portion thereof. The first crank portion is configured to radially shift one side of the U-shaped turn portion from the other side thereof by a first length. The one side of the U-shaped turn portion extends to one of the paired straight portions, and the other side thereof extends to the other thereof. The first length is substantially equivalent to a lateral width of the U-shaped turn portion of the first segment of each of the sets. The method further includes deforming part of the U-shaped turn portion of the second segment of each of the sets in a direction substantially perpendicular to an extending direction of the U-shaped turn portion to form a second crank portion of the second segment of each of the sets at the part of the U-shaped turn portion thereof, the second crank portion being configured to radially shift one side of the U-shaped turn portion from the other side thereof by a second length. The one side of the U-shaped turn portion extends to one of the paired straight portions, and the other side thereof extends to the other thereof. The second length is determined to allow the second crank portion of the second segment of each of the sets to substantial overlay the first crank portion of the first segment of each of the sets. The method includes inset the first and second segments of each of the sets into the slots of the stator core while the second segment surrounds the first conductor segment in each of the slots.

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT

AND ITS MODIFICATIONS OF THE INVENTION

An embodiment of the present invention will be described hereinafter with reference to the accompanying drawings.

Figure 1:
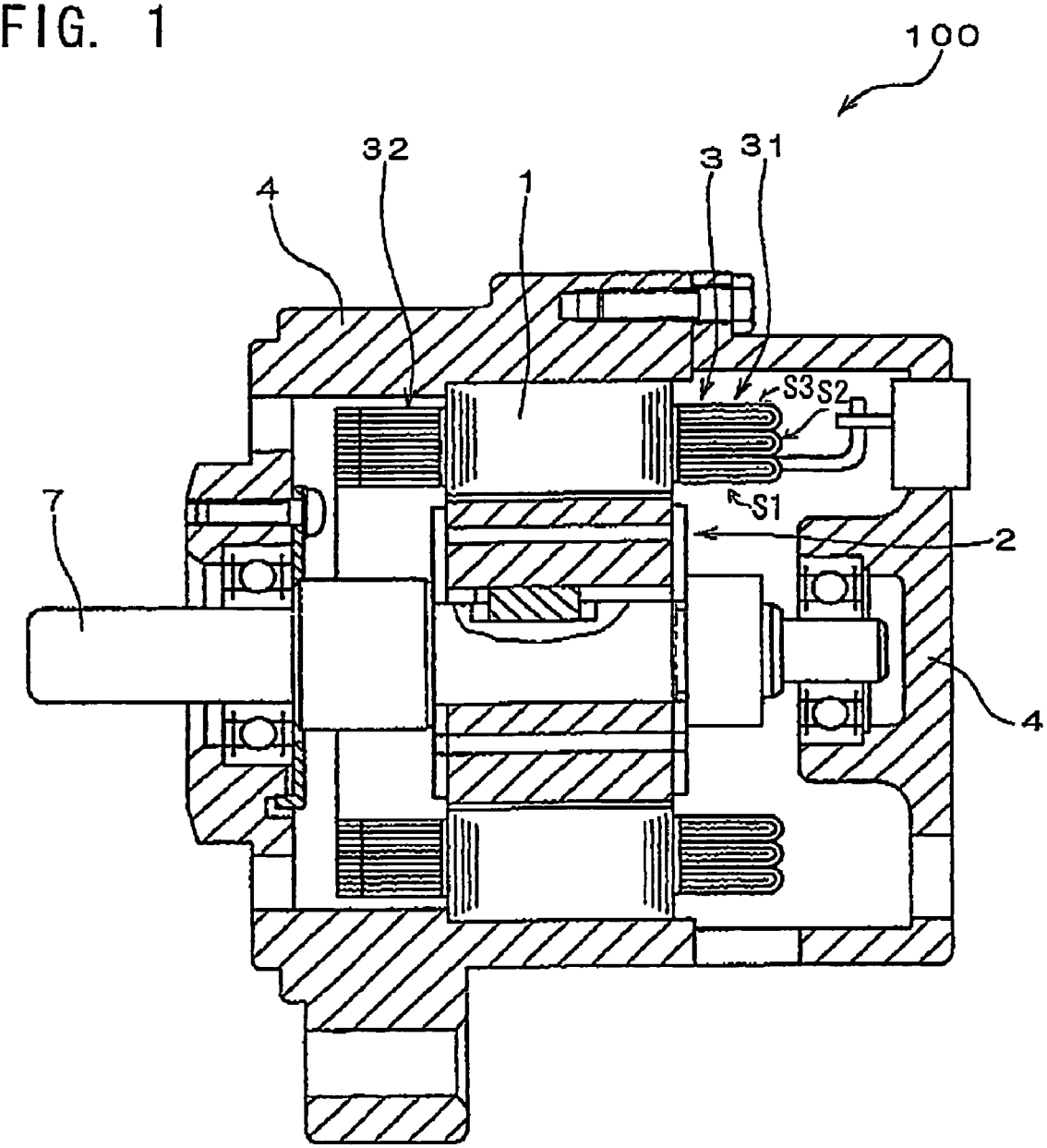
FIG. 1 is partially axial sectional view illustrating a motor, as an example of rotary electrical machines, according to an embodiment of the present invention.

Referring to the drawings, in which like reference characters refer to like parts in several views, particularly to FIG. 1, there is illustrated a motor 100, as an example of rotary electric machines.

The motor 100 is provided with a stator core 1, a rotor 2, a stator coil 3, a substantially cylindrical hollow housing 4, and a rotary shaft 7.

The stator core 1 has, for example, a substantially annular shape, and has a plurality of slots 35. The slots 35 are formed through the stator core 1 and are circumferentially arranged at given intervals. The circumferential interval of adjacent slots 35 defines a slot pitch α.

The stator core 1 is fixed to an inner peripheral wall of the housing 4. The stator coil 3 is wound in the slots 35 of the stator core 1. The rotor 2 is designed to, for example, an IPM (Interior Permanent Magnet) rotor which is attached to the rotary shaft 7 rotatably supported in the housing 4 by bearings. The rotor 2 is disposed within the stator core 1.

The stator coil 3 is composed of three-phase armature windings 3a and electrically connected to a three-phase inverter. The three-phase inverter is electrically connected to a battery of, for example, 300 V. Based on the battery, the three-phase inverter allows power to be fed to the stator coil 3. The stator core 1 and the stator coil 3 provide a stator ST of the motor 100.

The motor 100 can be installed in a vehicle, such as a storage battery-powered vehicle, a fuel cell-powered vehicle, or a hybrid vehicle, and can be a permanent magnet three-phase brushless DC motor (synchronous motor) designed to produce power required to drive the vehicle. The motor 100 can adopt one of rotors having various structures. Motors using various structures of rotors have been well known, so that detailed descriptions of the principal of the motor's operation are omitted.

Figure 2:
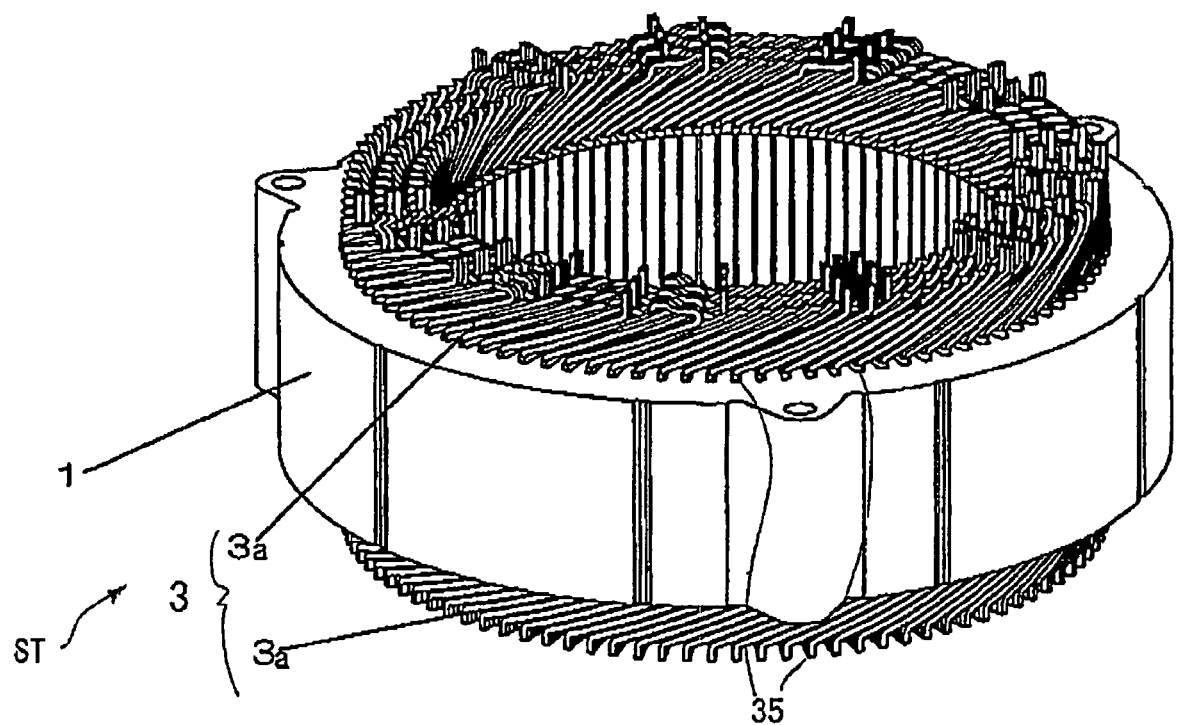
FIG. 2 is an enlarged perspective view of a stator according to the embodiment.
Figure 3:
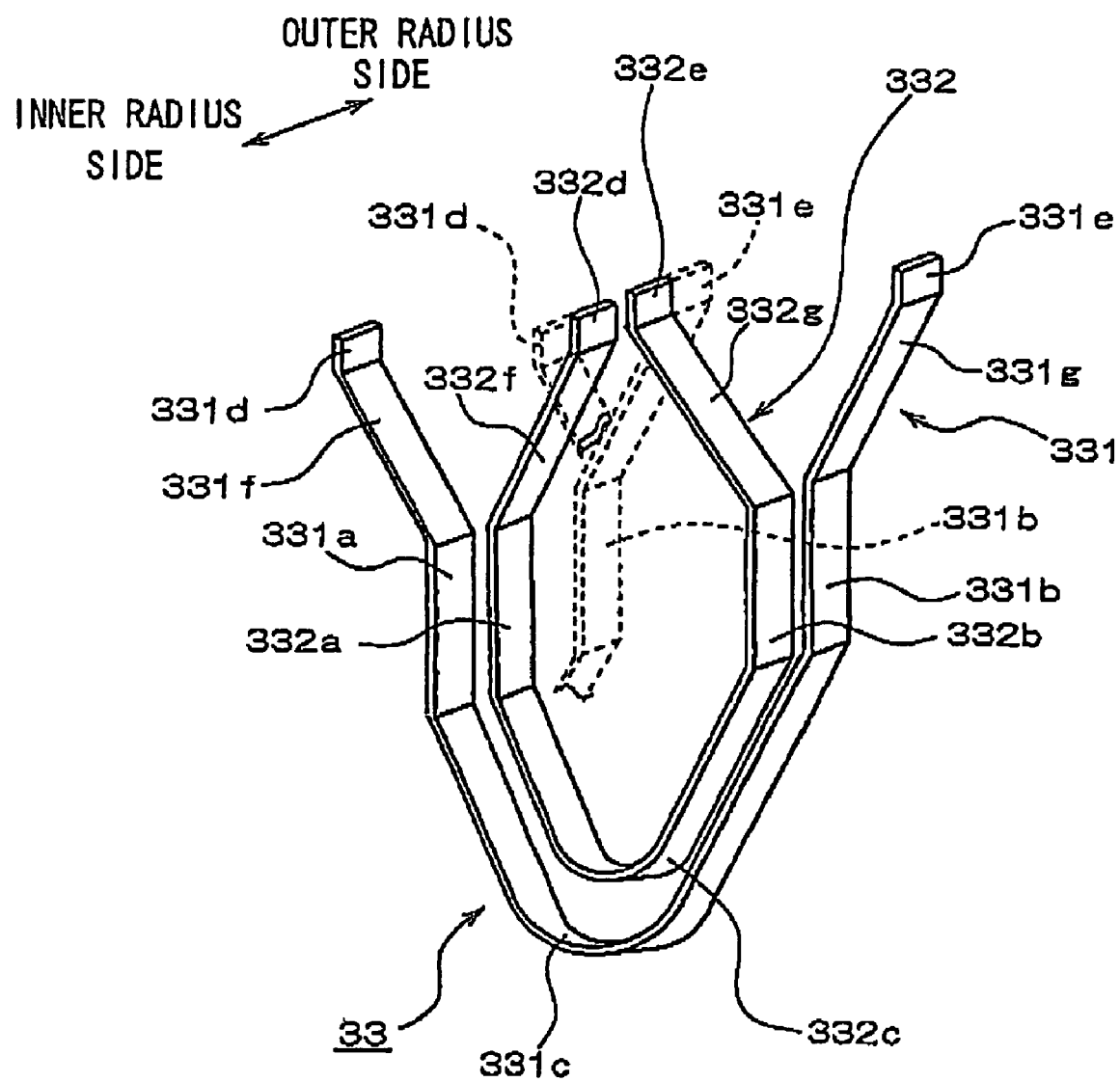
FIG. 3 is an enlarged perspective view schematically illustrating conductor segments constituting a stator coil of the stator illustrated in FIG. 2.
Figure 4:
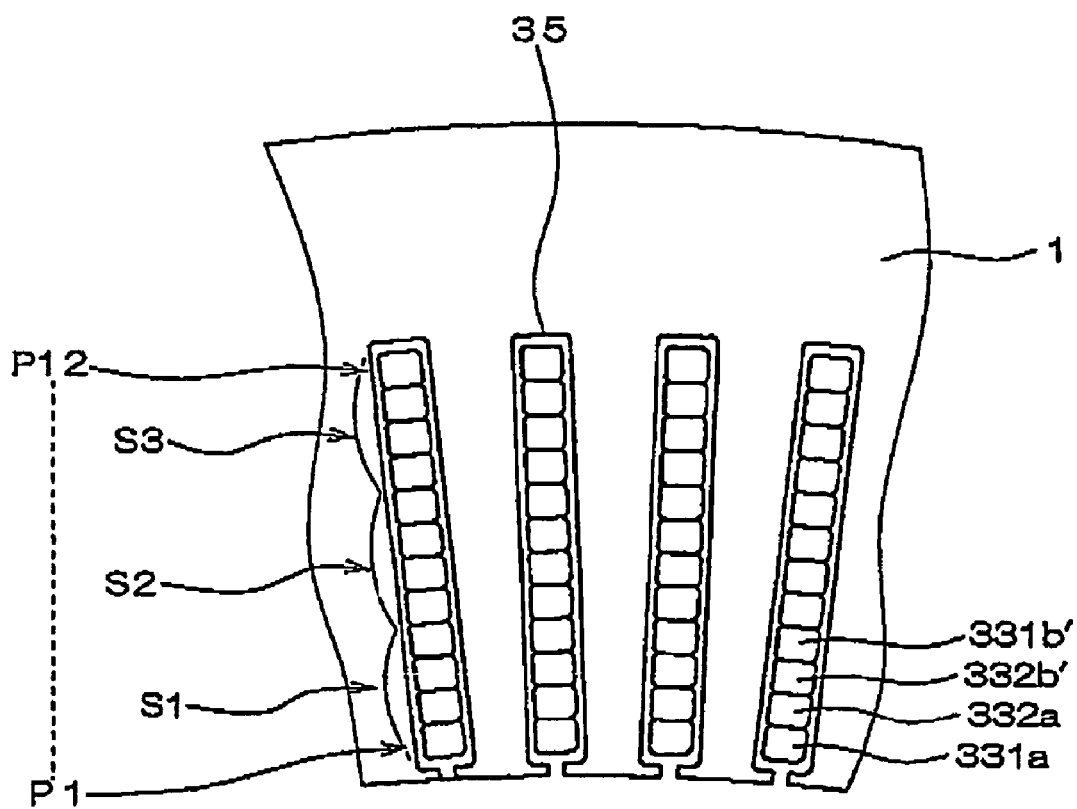
FIG. 4 is an enlarged partially radial cross sectional view of a stator core of the stator, which schematically illustrates some of the conductor segments received in corresponding slots of a stator core of the stator illustrated in FIG. 2.

FIG. 2 illustrates the whole structure of the stator ST, FIG. 3 illustrates conductor segments constituting the stator coil 3, and FIG. 4 schematically illustrates some of the conductor segments received in the corresponding slots 35 of the stator core 1.

The stator coil 3 (each of the three-phase windings 3a) is made up of sequentially joined conductor segments 33 as illustrated in FIG. 3.

The conductor segments 33 are placed within the slots 35 of the stator core 1 as illustrated in FIG. 4. The conductor segments 33 are inserted into the slots 35 from one annular end surface of the stator core 1 to cause legs thereof to project from the other annular end surface of the stator core 1 by predetermined lengths. The legs of the conductor segments 33 are bent by an electrical angle of approximately π/2 in a circumferential direction of the stator core 1 when one pole pitch of the motor 100 is set to an electric angle of π. The ends of the projecting legs of the conductor segments 33 are welded in a predetermined combination.

Such a stator coil structure has been well known in, for example, U.S. Pat. Nos. 6,201,332 B1, 6,249,956 B1, 6,404,091 B1, and 6,885,123 B2. Because all of the U.S. patents are assigned to the same assignee as that of this application, disclosures of these patents are incorporated herein by reference.

Each of the conductor segments 33 has a substantially long plate-like U or V shape, and is covered with an insulation film, such as a resinous film, except for the welded ends thereof.

Each of the conductor segments 33 is composed of a pair of straight conductor portions and a U- or V-shaped turn portion such that the paired straight conductor portions extending at their one ends from ends of the turn portion; these straight conductor portions are to be inserted into the slots 35. These straight conductor portions will also be referred to as slot-inserted conductor portions hereafter.

Each of the conductor segments 33 is also composed of projecting end portions continuing from the other ends of the straight conductor portions and projecting outside the slots 35 when the straight conductor portions are placed within the slots 35.

The turn portion of each of the conductor segments 33 connects both the one ends of the paired straight conductor portions of each of the conductor segments 33 without kinks.

The total lengths of the conductor segments 33 in their longitudinal directions are different from each other, one of which is longer than the other.

Incidentally, the conductor segments 33 have no projecting end portions before being inserted into the slots 35 so that the slot-inserted conductor portions and the projecting end portions serve as the straight conductor portions.

Specifically, the stator coil 3 includes an annular first coil end portions 31 constituted by the turn portions of the conductor segments 33 whose straight conductor portions are being inserted into the slots 35. The stator coil 3 also includes an annular second coil end portions 32 constituted by the projecting portions of the conductor segments 33 whose straight conductor portions are being inserted into the slots 35.

In the embodiment, as illustrated in FIG. 3, one of the conductor segments 33 larger in length than the other thereof is referred to as a large-sized conductor segment 331; the other of the conductor segments 33 is referred to as a small-sized conductor segment 332. Each pair of the large-sized conductor segment 331 and the small-sized conductor segment 332 will be also referred to as a segment set hereinafter.

Specifically, the large-sized conductor segment 331 consists of the turn portion 331c, the slot-inserted conductor portions 331a and 331b, and the projecting end portions (legs) 331f and 331g. Tips of the projecting end portions 331f and 331g of the large-sized conductor segment 331 serve as portions to be joined.

Similarly, the small-sized conductor segment 332 consists of the turn portion 332c, the slot-inserted conductor portions 332a and 332b, and the projecting end portions (legs) 332f and 332g. The projecting end portions 332f and 332g of the sill-sized conductor segment 332 serve as portions to be joined. Moreover, the turn portions 331c and 332c will also be referred to as head portions hereinbelow.

As illustrated in FIG. 3, each reference number with no dash and that with a dash (') are assigned to the identical portions of different large-sized conductor segments 331. Similarly, each reference number with no dash and that with a dash (') are assigned to the identical portions of different small-sized conductor segments 332.

For example, when a segment set of the large-sized and small-sized conductor segments 331 and 332 is arranged as illustrated in FIG. 3, the tip 332d of the small-sized conductor segment 332 and the tip 331d' of another large-sized conductor segment 331 located adjacent to each other in a corresponding radial direction of the stator core 1 are welded together. Similarly, the tip 332e of the small-sized conductor segment 332 and the tip 331e' of another large-sized conductor segment 331 located adjacent to each other in the radial direction of the stator core 1 are welded together.

In the embodiment, as illustrated in FIGS. 1 and 4, first to third groups of the conductor segments 33 are placed within each of the slots 35 in alignment in a corresponding radial direction of the stator core 1. In the following description, the first, second, and third groups will be designated by S1, S2, and S3 from inside to outside of the stator core 1.

For example, as illustrated in FIGS. 3 and 4, the slot-inserted conductor portions 331a and 332a of one segment set are received in one of the slots 35 in alignment in a corresponding redial direction such that the slot-inserted conductor portion 331a is arranged on the inner side of the slot-inserted conductor portion 332a.

When the slot-inserted conductor portions 331a and 332a of one segment set are received in one of the slots 35 in such alignment, the slot-inserted conductor portions 331b and 332b of the same segment set are received in another one of the slots 35; another one of the slots 35 is located to be spaced at an interval T from the one of the slots 35 in the circumferential direction of the stator core 1. The interval T is set to an odd multiple of the one pole pitch of the electric angle π, and, in the embodiment, it is set to the one pole pitch (electric angle π).

In addition, while the slot-inserted conductor portions 331a and 332a of one segment set are received in one of the slots 35 in such alignment, the turn portion 332c of the small-sized conductor segment 332 of the one segment set is located inside the turn portion 331c of the large-sized conductor segment 331 thereof.

As clearly illustrated in FIG. 4, each of the slots 35 has the same length in the corresponding radial direction of the stator core 1, respectively. Within each of the slots 35, twelve slot-inserted portions of the conductor segments 33 are received to be arrayed in the corresponding radial direction of the stator core 1. In the following descriptions, the twelve slot-inserted portions located in each of the slots 35 will also be referred to as a first layer to a twelfth layer from inside to outside of the stator core 1, respectively, hereinafter.

In addition, the locations of the first to twelfth layers in each of the slots 35 will also be referred to as a first layer position P1 to a twelfth layer position P12, respectively.

In each of the slots 35, the first to third groups S1 to S3 of the conductor segments 33 are arrayed in sequence in the corresponding radial direction of the stator core 1.

Specifically, the first group S1 of the conductor segments 33 occupies the first to fourth layer positions P1 to P4, and the second group S2 of the conductor segments 33 occupies the fifth to eighth layer positions P5 to P8. In addition, the third group S3 of the conductor segments 33 occupies the ninth to twelfth layer positions P9 to P12.

In an individual group, as for example, in the innermost first group S1, the slot-inserted portion 331a of the large-sized conductor segment 331 of one segment set is received within one of the slots 35 at the first layer position P1 thereof. The slot-inserted portion 332a of the large-sized conductor segment 331 of the same one segment set is received within the same one of the slots 35 at the second layer position P2 thereof.

Similarly, the slot-inserted portion 332b' of the small-sized conductor segment 332 of another one segment set is received within the same one of the slots 35 at the third layer position P3. Moreover, the slot-inserted portion 331b' of the small-sized conductor segment 332 of another one segment set is received within the same one of the slots 35 at the fourth layer position P4. The other second to third groups S2 to S3 are also placed within the same one of the slots 35 in the same manner as that of the first group S1 of the conductor segments 33. Descriptions of the arrangements of the segments 33 belonging to the other second to third groups S2 to S3 within the same one of the slots 35 are therefore omitted.

That is, as illustrated in FIG. 4, each slot 35 contains four layers of the slot-inserted conductor portions 331a, 332a, 332b', and 331b' in line; these slot-inserted portions 332b' and 331b' belong to the small-sized conductor segment 332 and the large-sized conductor segment 331, which are different from those to which the slot-inserted portions 332a and 331a belong.

Figure 5:
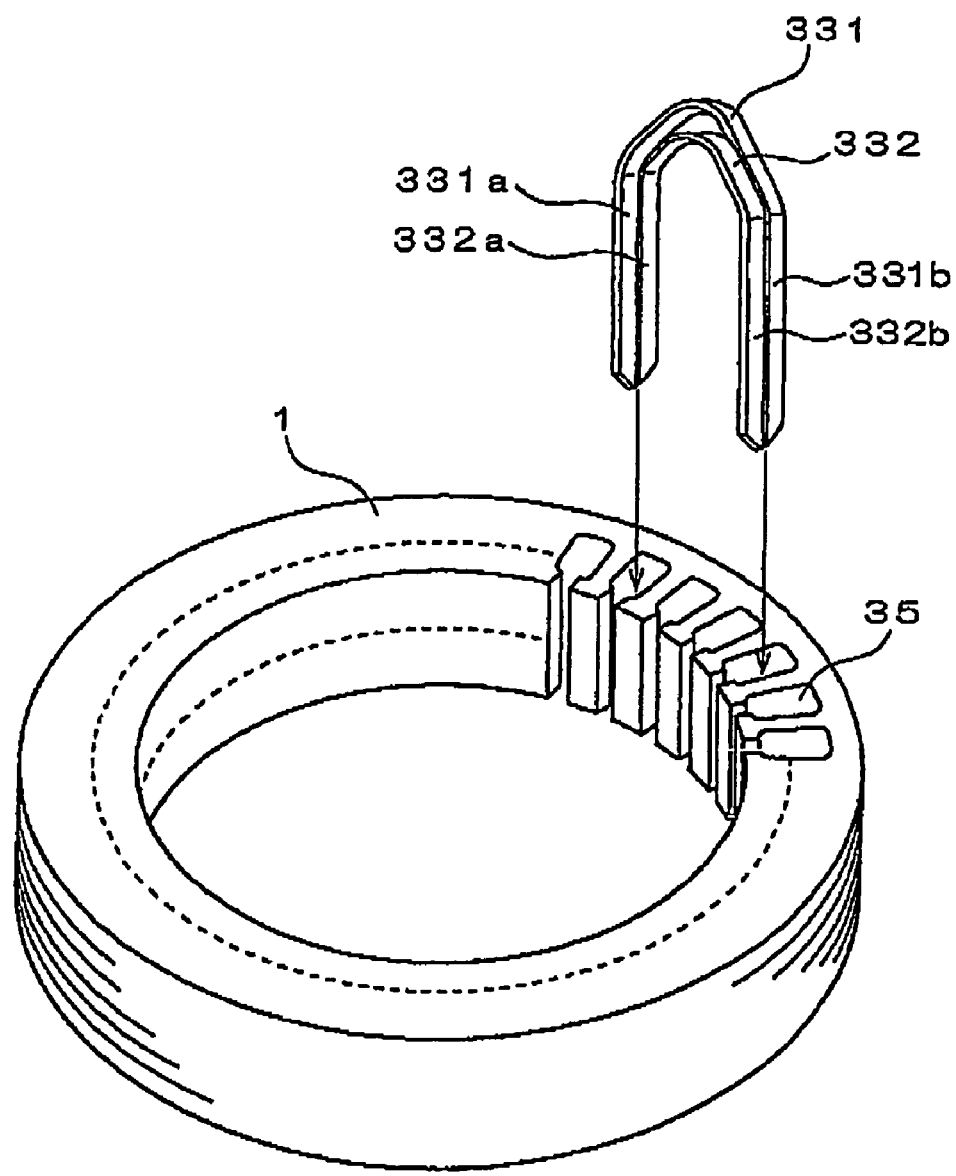
FIG. 5 is an enlarged perspective view schematically illustrating a set of the conductor segments immediately before they are inserted into corresponding slots of the stator core of the stator illustrated in FIG. 2.
Figure 6:
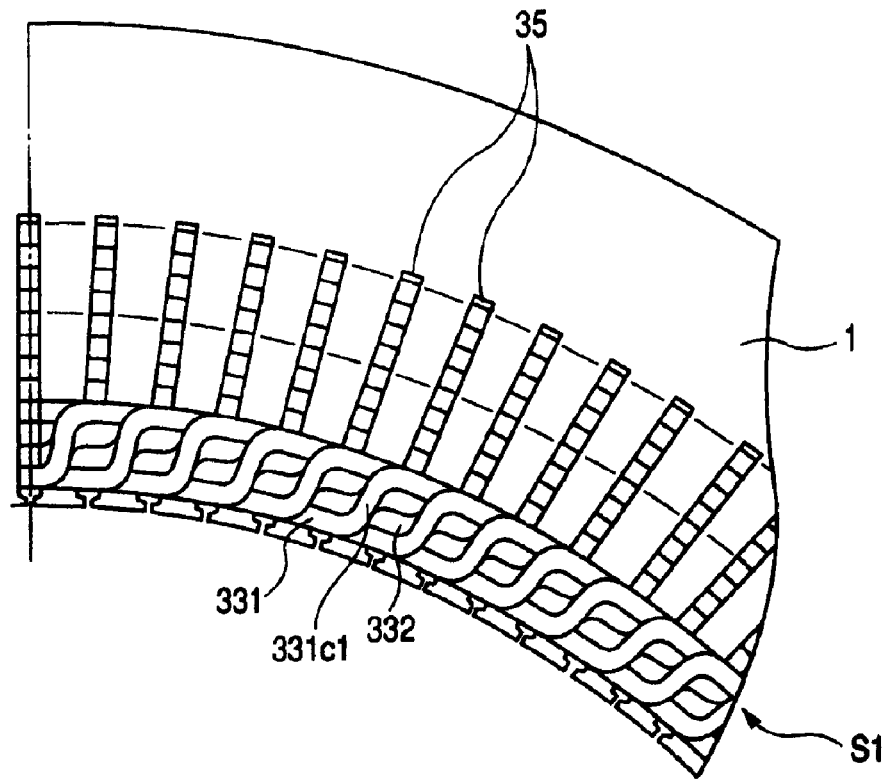
FIG. 6 is an enlarged perspective view schematically illustrating first groups of the conductor segments received in corresponding slots of the stator core and arranged in the circumferential direction thereof.
Figure 7:
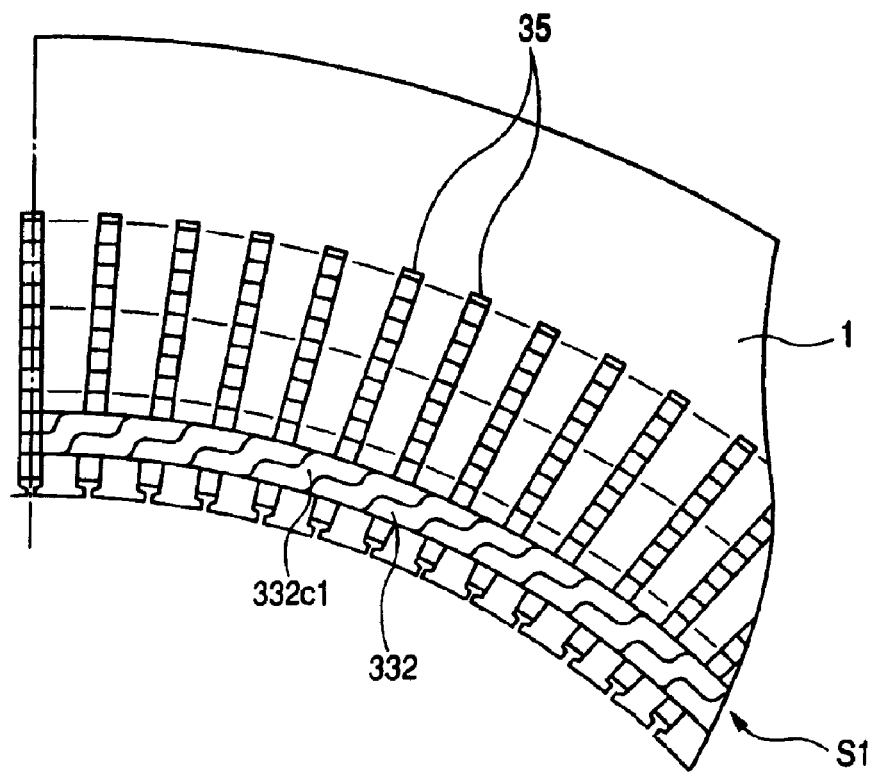
FIG. 7 is an enlarged perspective view schematically illustrating small-sized conductor segments of the first groups of the conductor segments illustrated in FIG. 6 when large-sized conductor segments are omitted.

FIG. 5 illustrates a set of the large-sized conductor segment 331 and the small-sized conductor segment 332 immediately before they are inserted into the corresponding slots 35 of the stator core 1. FIG. 6 schematically illustrates the first groups S1 of the conductor segments 33 received in the corresponding slots 35 of the stator core 1 and arranged in the circumferential direction thereof. FIG. 7 schematically illustrates the small-sized conductor segments of the first groups S1 of the conductor segments 33 illustrated in FIG. 6 when the large-sized conductor segments are omitted.

Figure 8:
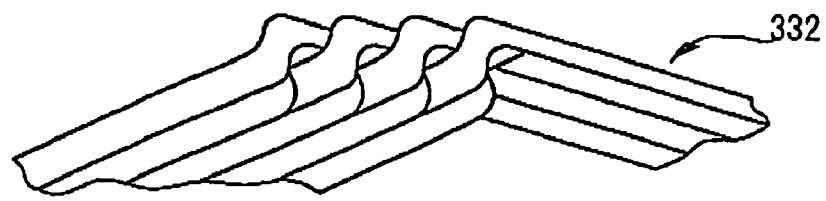
FIG. 8 is an enlarged perspective view schematically illustrating head portions of some of the small-sized conductor segments.
Figure 9:
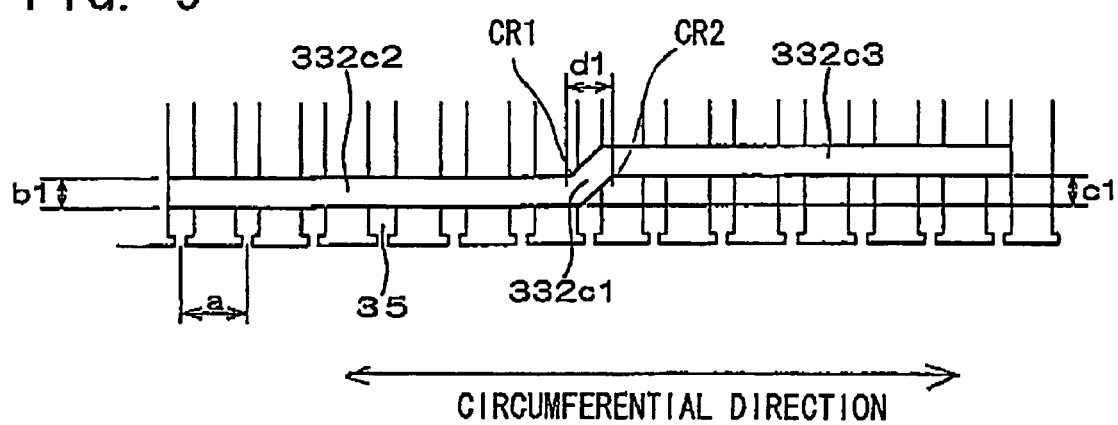
FIG. 9 is an enlarged plan view of one of the small-sized conductor segments by developing it in the circumferential direction of the stator core.
Figure 10:
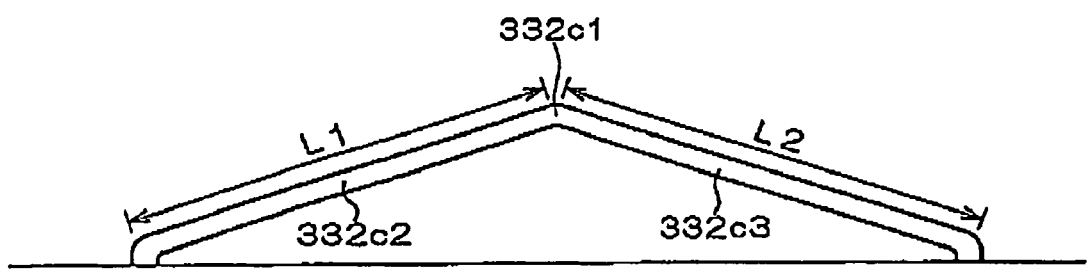
FIG. 10 is an enlarged side view of the one of the small-sized conductor segments illustrated in FIG. 9.

Moreover, FIG. 8 schematically illustrates the head portions 332c of some of the small-sued conductor segments 332. FIG. 9 schematically illustrates one of the small-sized conductor segments 332 by developing it in the circumferential direction of the stator core 1. FIG. 10 schematically illustrates the one of the small-sized conductor segments illustrated in FIG. 9.

Figure 11:
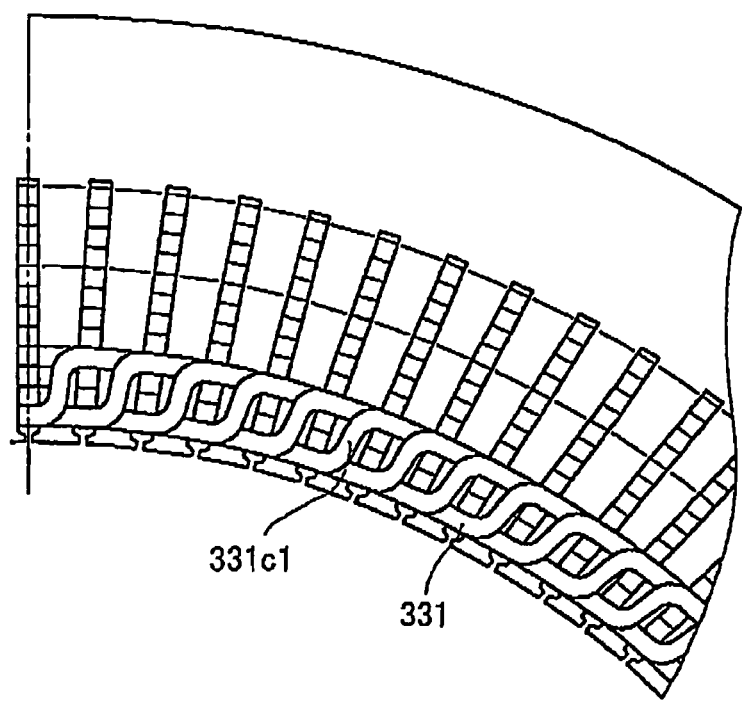
FIG. 11 is an enlarged perspective view schematically illustrating large-sized conductor segments of the first groups of the conductor segments illustrated in FIG. 6 when the small-sized conductor segments are omitted.
Figure 12:
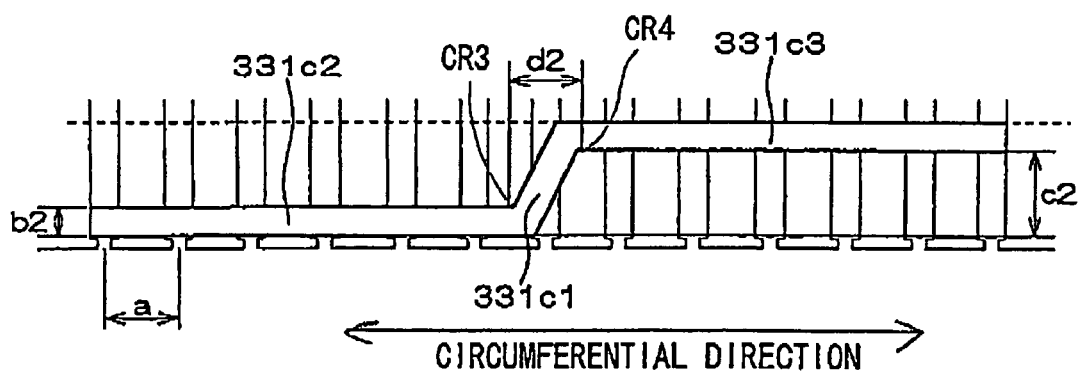
FIG. 12 is an enlarged plan view of one of the large-sized conductor segments by developing it in the circumferential direction of the stator core.
Figure 13:
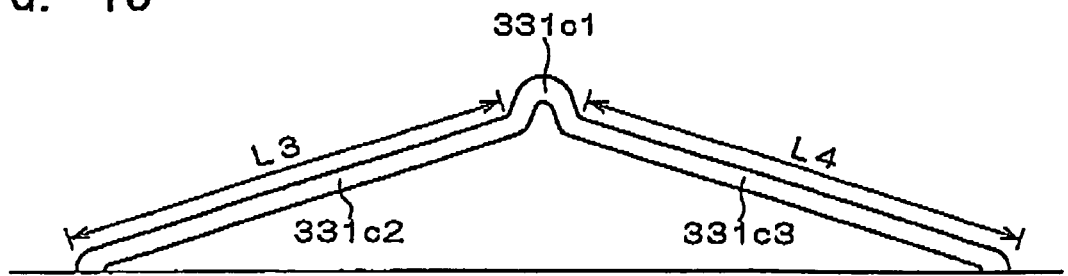
FIG. 13 is an enlarged side view of the one of the large-sized conductor segments illustrated in FIG. 12.

FIG. 11 schematically illustrates the large-sized conductor segments of the first groups S1 of the conductor segments 33 illustrated in FIG. 6 when the small-sized conductor segments are omitted. FIG. 12 schematically illustrates one of the large-sized conductor segments 333 by developing it in the circumferential direction of the stator core 1. FIG. 13 schematically illustrates the one of the large-sized conductor segments illustrated in FIG. 12.

As illustrated in FIGS. 9 and 10, the turn portion (head portion) 332c of each small-sized conductor segment 332 is composed of a tip portion 332c1 formed with a crank (bent portion) and a pair of slant portions 332c2 and 332c3. The tip portion 332c1 will also be referred to as a crank portion herein below.

The paired slant portions 332c2 and 332c3 are designed to continue from ends of the tip portion 332c1, slant to the circumferential and the axial directions of the stator core 1, and lead to the slot-inserted conductor portions 332a and 332b, respectively.

The crank portion 332c1 is designed to radially shift one of the paired slant portions 332c2 and 332c3 from the other thereof by a predetermined displacement length c1 without being twisted; the predetermined displacement length c1 is substantially equivalent to a radial width b1 of each of the paired slant portions 332c2 and 332c3.

In addition, the axial end surfaces of the paired slant portions 332c2 and 332c3 straightly extending from the ends of the crank portion 332c1 to the slot-inserted portions 332a and 332b have lengths L1 and L2, which are substantially equal to each other.

Moreover, the crank portion 332c1 has a width d1 in the circumferential direction of the slot core 1. Specifically, the width d1 represents a radial length between an inside corner CR1 and an inside corner CR2; this inside corner CR1 is a corner between the outer surface of the crank portion 332c1 and that of the slant portion 332c2, and this inside corner CR2 is a corner between the inner surface of the crank portion 332c1 and that of the slant portion 332c3.

The width d1 is designed to be kept within the slot pitch a of the stator core 1. Specifically, the width d1 is determined to a length not more than the slot pitch a of the stator core 1.

Similarly, as illustrated in FIGS. 12 and 13, the turn portion (head portion) 331c of each large-sized conductor segment 331 is composed of a tip portion 331c1 formed with a crank (bent portion) and a pair of slant portions 331c2 and 331c3. The tip portion 331c1 will also be referred to as a crank portion herein below.

The paired slant portions 331c2 and 331c3 are configured to continue from ends of the tip portion 331c1, slant to the circumferential and the axial directions of the stator core 1, and lead to the slot-inserted conductor portions 331a and 331b, respectively.

The crank portion 331c1 is designed to radially shift one of the paired slant portions 331c2 and 331c3 from the other thereof by a predetermined displacement length c2 without being twisted. The predetermined displacement length c2 is designed to allow the crank portion 331c1 of each large-sized conductor segment 331 to substantially overlay the crank portion 332c1 of corresponding each small-sized conductor segment 332.

Specifically, the predetermined displacement length c2 is given by "$c2=2 \times b1-b2$", where b2 represents a radial width of each of the paired slant portions 331c2 and 331c3. In other words, the predetermined displacement length c2 is obtained by the sum of the double of the radial width b1 of each of the paired slant portions 332c2 and 332c3 and the racial width b2 of each of the paired slant portions 331c2 and 331c3. Because the radial width b1 of each of the paired slant portions 332c2 and 332c3 is equal to the radial width b2 of each of the paired slant portions 331c2 and 331c3, the predetermined displacement length c2 is represented as "$3 \times b1$ (b2)".

In addition, the paired slant portions 331c2 and 331c3 straightly extending from the ends of the crank portion 331c1 to the slot-inserted portions 331a and 331b have lengths L3 and L4, which are substantially equal to each other.

An example of production procedures of the stator coil 3 will be described hereinafter.

Folding Process

First, a continuous wire-rod conductor with a rectangular shape in its lateral cross section is prepared. The wire-rod conductor is cut into a first group of predetermined length pieces corresponding to the small-sized conductor segments 332 and a second group of predetermined length pieces corresponding to the large-sized conductor segments 331; this length of each piece of the first group is smaller than that of each of the second group.

Figure 14:
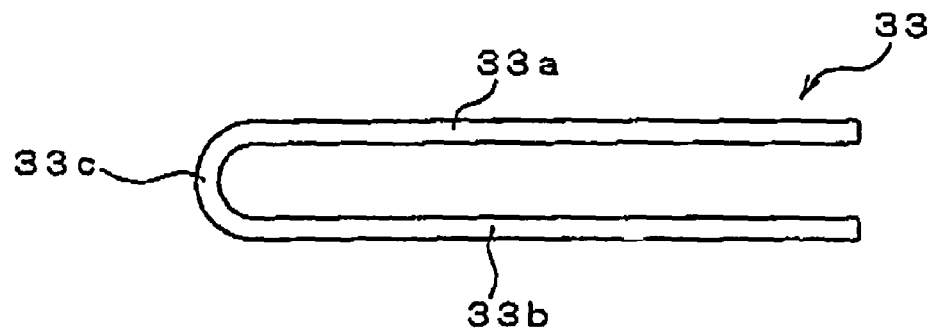
FIG. 14 is an enlarged side view of a U-shaped conductor segment before twisting.
Figure 15:
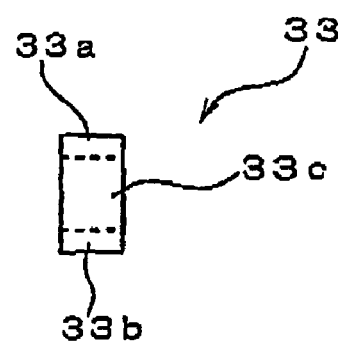
FIG. 15 is an enlarged side view of the U-shaped conductor segment before twisting, as it would be seen from its turn portion.

After the cutting, each individual piece of each of the first and second groups is folded at its middle portion to form a substantially U-shaped conductor segment 33 before bending. Specifically, as illustrated in FIGS. 14 to 16, each individual piece 33 of the first and second groups is bent such that it has a pair of straight portions 33a and 33b and a U-shaped turn portion 33c; these paired sit portions 33a and 33b extend from ends of the turn portion 33c.

Figure 16:
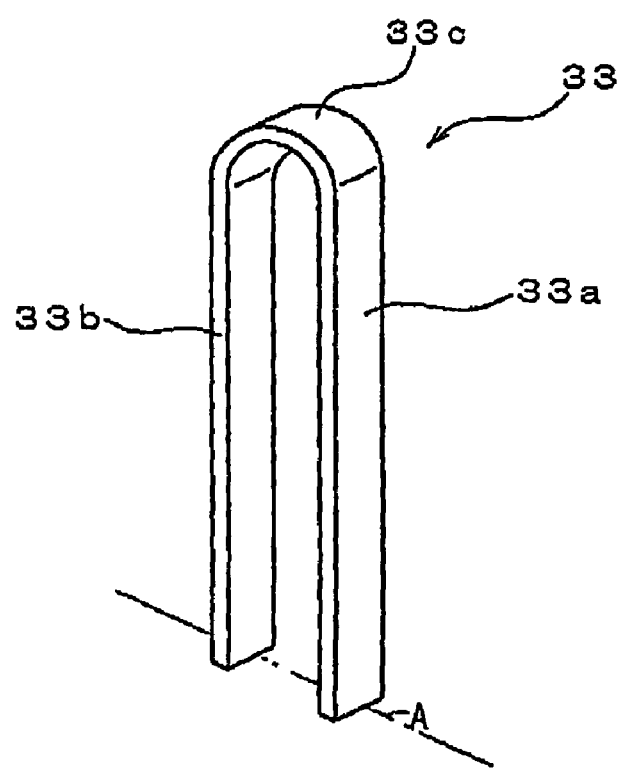
FIG. 16 is an enlarged perspective view of the U-shaped conductor segment before bending.

In FIG. 16, the straight portions 33a and 33b of each individual conductor segment 33 have rectangular shaped end surfaces, and they are aligned in a first direction A passing through the center points of the end surfaces.

Turn Portion Bending Process

Next, as a turn portion bending process, the tun portion 33c of each individual U-shaped conductor segment 33 is bent. Specifically, in the turn portion bending process, the straight portions 33a and 33b are relatively moved away from each other in directions different from the first direction A. This turn portion bending step is achieved in, for example, a manner described herein below.

Figure 17:
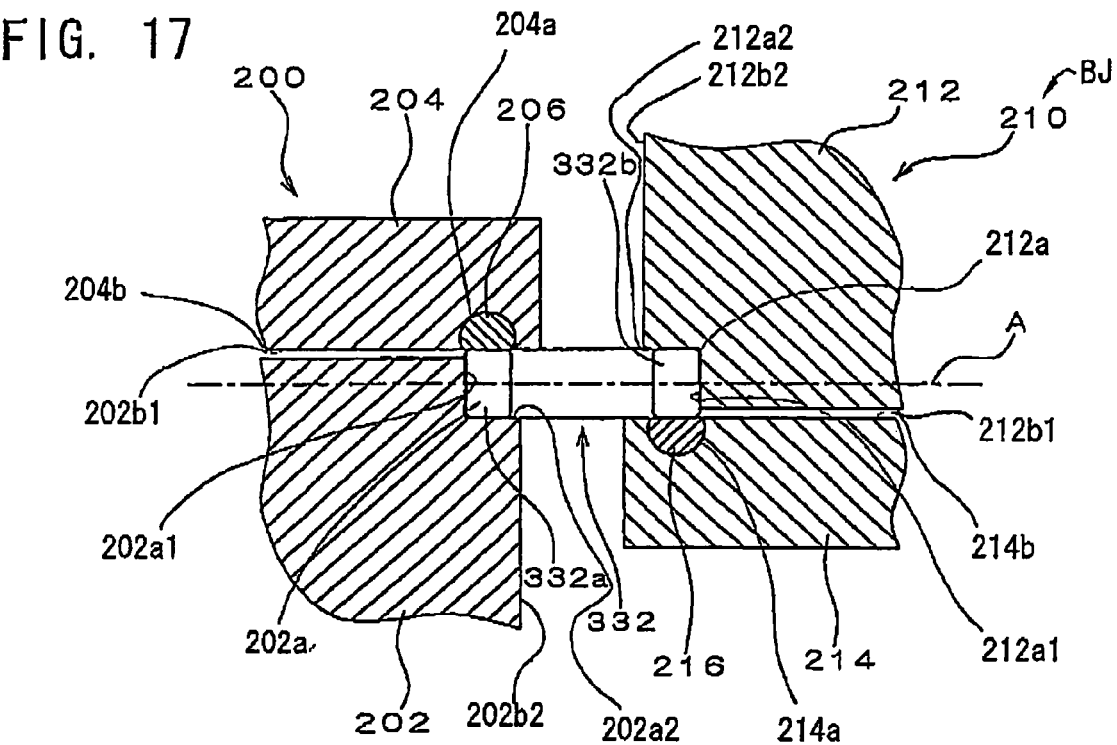
FIG. 17 is an enlarged partially cross sectional view schematically illustrating a bending jig composed of a securing damper and a movable clamper, these clampers support one of the U-shaped conductor segments included in a first group before bending.

FIG. 17 schematically illustrates a bending jig BJ composed of a securing damper 200 and a movable damper 210; these clampers 200 and 210 support one of the U-shaped conductor segments 33 (small-sized conductor segments 332) included in the first group before bending. In addition, FIG. 18 schematically illustrates the one of the U-shaped conductor segments 332 supported by the bending jig BJ after being bent thereby.

Figure 18:
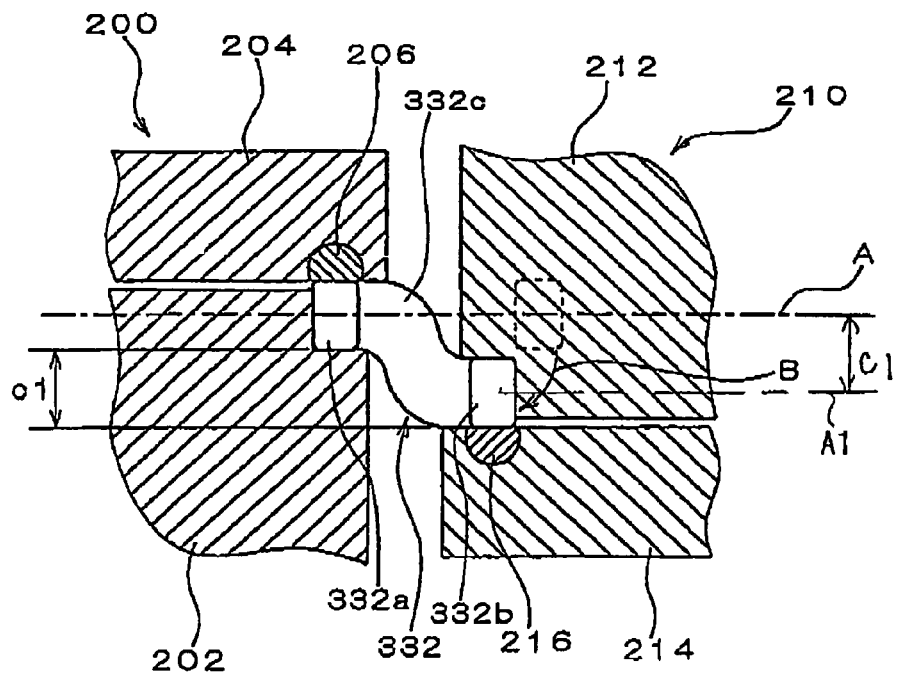
FIG. 18 is an enlarged partially cross sectional view schematically illustrating the one of the U-shaped conductor segments supported by the bending jig illustrated in FIG. 17 after being bent thereby.

As illustrated in FIGS. 17 and 18, the securing clamper 20 is equipped with a holder 202, a movable press member 204, and an adjustable member 206.

The holder 202 has, for example, a rectangular-parallelepiped shape and a support groove 202a formed at its one corner portion between adjacent sides 202b1 and 202b2 thereof. The support groove 202a has first and second support surfaces 202a1 and 202a2 orthogonal to each other and orthogonal to the sides 202b1 and 202b2, respectively. The support groove 202a also has a corner portion formed by the first and second support surfaces 202a1 and 202a2. The configuration of the support groove 202a allows the straight portion 332a of one of the U-shaped conductor segments 33 (332) to be mounted therein such that an outer surface and one of opposed longitudinal side surfaces of the straight portion 332a adjacent to each other abut on the first and second support surfaces 202a1 and 202a2, respectively.

The movable press member 204 has, for example, a rectangular-parallelepiped shape and has a substantially cylindrical groove 204a formed on one side 204b thereof. The movable press member 204 is arranged such that the one side 204b thereof is opposite to the one side 202b1 of the holder 202 in parallel thereto with a given gap therebetween.

The adjustable member 206 has a longitudinally notched cylindrical shape with a substantially crown shape in its lateral cross section.

Specifically, the adjustable member 206 has a plane side surface (press surface) and an annular side surface continuing therefrom.

The adjustable member 206 is received at its spherical portion within the cylindrical groove 204a to be rotatable around an axial direction thereof such that the press surface thereof faces the second support surface 202a2 of the support groove 202a of the holder 202 with an interval. The interval is, for example, determined to the sum of a longitudinal width of the straight portion 332a and a predetermined clearance; this clearance allows the straight portion 332a to be abutingly inserted in the space formed by the adjustable member 206 and the support groove 202a.

In the structure of the securing clamper 200, the straight portion 532a of one of the conductor segments 332 is inserted to be mounted in the support groove 202a such that the outer surface and the one of the opposed longitudinal side surfaces of the straight portion 332a abut on the first and second support surfaces 202a1 and 202a2, respectively.

This mount of the straight portion in the support groove 202a allows the press surface of the adjustable member 206 to abut and press against the other of the opposed longitudinal side surfaces of the straight portion 332a. This results in that the straight portion 332a of one of the U-shaped conductor segments 332 is fixed clamped by the adjustable member 206 and the support groove 202a of the holder 202 such that the press surface is in parallel to the other of the opposed longitudinal side surfaces of the straight portion 332a.

That is, the rotatably supported adjustable member 206 and the support groove 202a allow the straight portion 332a of one of the U-shaped conductor segments 332 to be fixedly securely held to the holder 202.

Similarly, the movable clamper 210 is provided with a holder 212, a movable press member 214, and an adjustable member 216; these components 210, 212, and 214 are constructively equivalent to the holder 202, the movable press member 204, and the adjustable member 206, respectively.

Specifically, the holder 212 has a support groove 212a formed at its one corner portion between adjacent sides 212b1 and 212b2 thereof. The support groove 212a has first and second support surfaces 212a1 and 212a2. The holder 212 is arranged to be opposite to the movable member 204 so as to allow the straight portion 332b of one of the conductor segments 332 whose straight portion 332a is fixedly supported by the support groove 202a of the holder 202 to be mounted in the support groove 212a.

The movable press member 214 has a substantially cylindrical groove 214a formed on one side 214b thereof. The adjustable member 216 has a press surface and an annular side surface continuing therefrom. The adjustable member 216 is received at its spherical portion within the cylindrical groove 214a to be rotatable around an axial direction thereof such that the press surface thereof faces the second support surface 212a2 of the support groove 212a of the holder 212 with an interval.

In the structure of the movable clamper 210, the straight portion 332b of one of the conductor segments 332 is inserted to be mounted in the support groove 212a such that the outer surface and one of opposed longitudinal side surfaces of the straight portion 332b abut on the first and second support surfaces 212a1 and 212a2, respectively.

This mount of the straight portion in the support groove 212a allows the press surface of the adjustable member 216 to abut and press against the other of the opposed longitudinal side surfaces of the straight portion 332b. This results in that the straight portion 332b of one of the conductor segments 382 is fixedly clamped by the adjustable member 216 and the support groove 212a of the holder 212 such that the press surface is in parallel to the other of the opposed longitudinal side surfaces of the straight portion 332b.

That is, the rotatably supported adjustable member 216 and the support groove 212a allow the straight portion 332b of one of the U-shaped conductor segments 332 to be fixedly securely held to the holder 212.

Moreover, the bending jig BJ is provided with a drive mechanism (not shown) mechanically coupled to the movable clamper 210. The drive mechanism works to move the whole movable clamper 210 in a direction orthogonal to the first direction A (see FIG. 17).

Specifically, while the straight portions 332a and 332b of one of the U-shaped conductor segments 332 are fixedly clamped by the clampers 200 and 210, the drive mechanism operates to displace the whole movable clamper 210 in the direction orthogonal to the first direction A (see FIGS. 17 and 18). For example, the drive mechanism operates to shift the whole movable clamper 210 in the direction orthogonal to the first direction A such that the adjustable members 206 and 216 are away from each other.

This results in that the straight portion 332b securely supported by the movable clamper 210 moves away from the first direction A with the movement of the whole movable clamper 210 in a direction shown by the arrow B in FIG. 18 so that the turn portion 332c of the one of the conductor segments 332 is bent.

In the embodiment, the amount of bending, in other words, the whole movable damper displacement is determined such that the distance between the other of the opposed longitudinal side surfaces of the straight portion 332b and the one of the opposed longitudinal side surfaces of the straight portion 332a is equivalent to the predetermined displacement length c1. That is, assuming that a second direction A1 passing through the center point of the end sauce of the straight portion 332b in parallel to the first direction A is decided, the distance between the first and second directions A and A1 is set to the predetermined displacement length c1 (see FIG. 18).

The whole movable damper displacement is also determined such that the distance between the straight portion 332a and the straight portion 332b in the first direction A is equivalent to the slot pitch a of the stator core 1.

Figure 19:
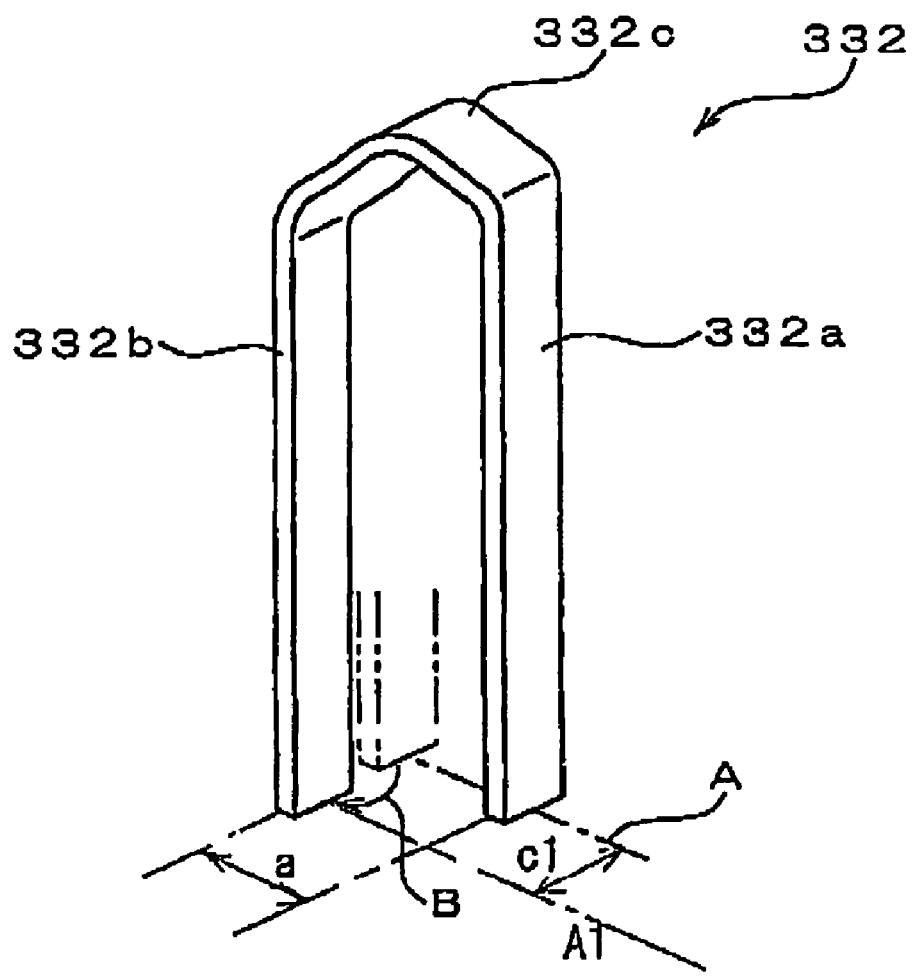
FIG. 19 is an enlarged perspective view schematically illustrating one of the small-sized conductor segments immediately after a bending process is applied thereto.

FIG. 19 schematically illustrates one of the small-sized conductor segments 332 immediately after the turn portion bending process is applied thereto.

As compared with the structure of the U-shaped conductor segment before bending illustrated in FIG. 16, the small-sized conductor segment 332 illustrated in FIG. 19 has the different structure described hereinafter.

Specifically, the straight portion 332b corresponding to the straight portion 33b is moved away from a position on the first direction A to bend the turn portion 332c corresponding to the turn portion 33c so that the second direction A1 on the straight portion 332b is in parallel to the first direction A and spaced at the length c1 therefrom.

Note that, in the turn portion bending process, the straight portion 332b can be fixedly clamped by the securing clamper 200, and the straight portion 332a can be fixedly clamped by the movable damper 210.

In the manner, all of the U-shaped conductor segments 33 (small-sized conductor segments 332) included in the first group are subjected to the turn portion bending process so that they are bent to have the structures illustrated in FIG. 19, respectively.

Similarly, all of the U-shaped conductor segments 33 large-sized conductor segments 331) included in the second group before bending are subjected to the turn portion bending process using the bending jig BJ.

Figure 20:
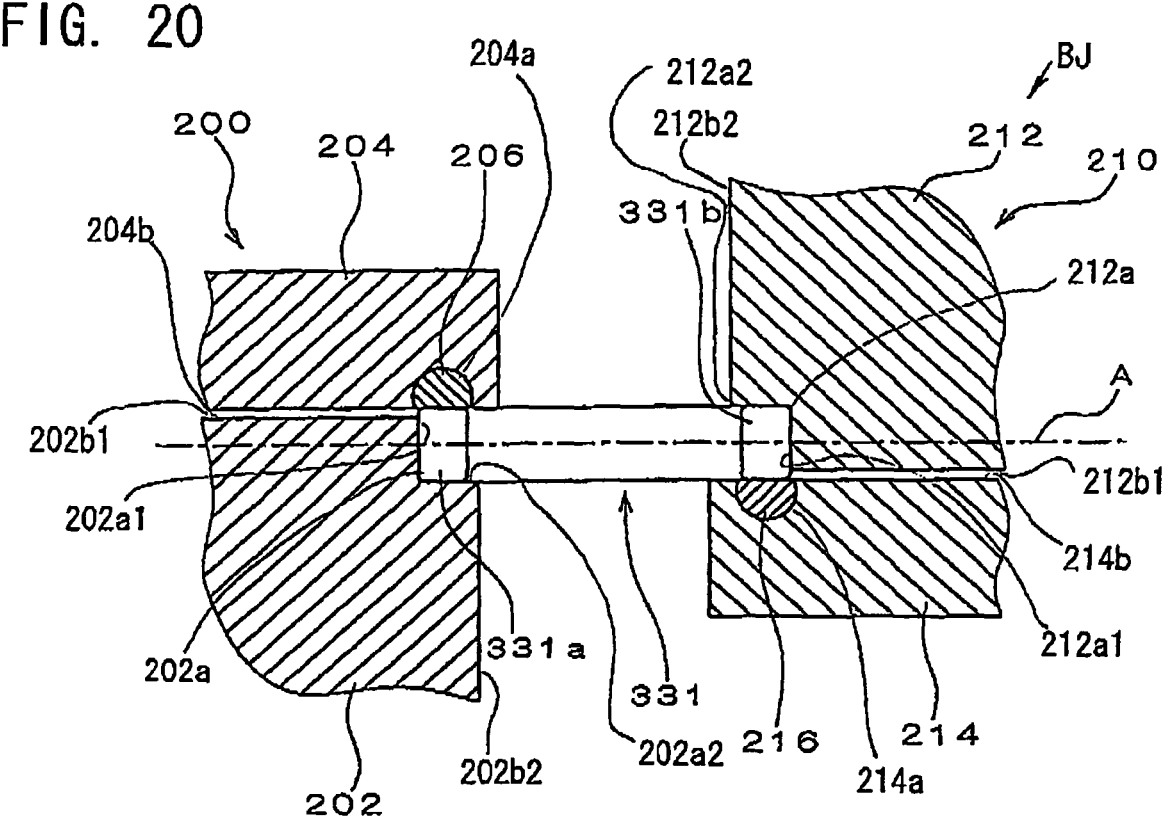
FIG. 20 is an enlarged partially cross sectional view schematically illustrating one of the U-shaped conductor segments included in a second group before bending, which is supported by the bending jig illustrated in FIG. 17.
Figure 21:
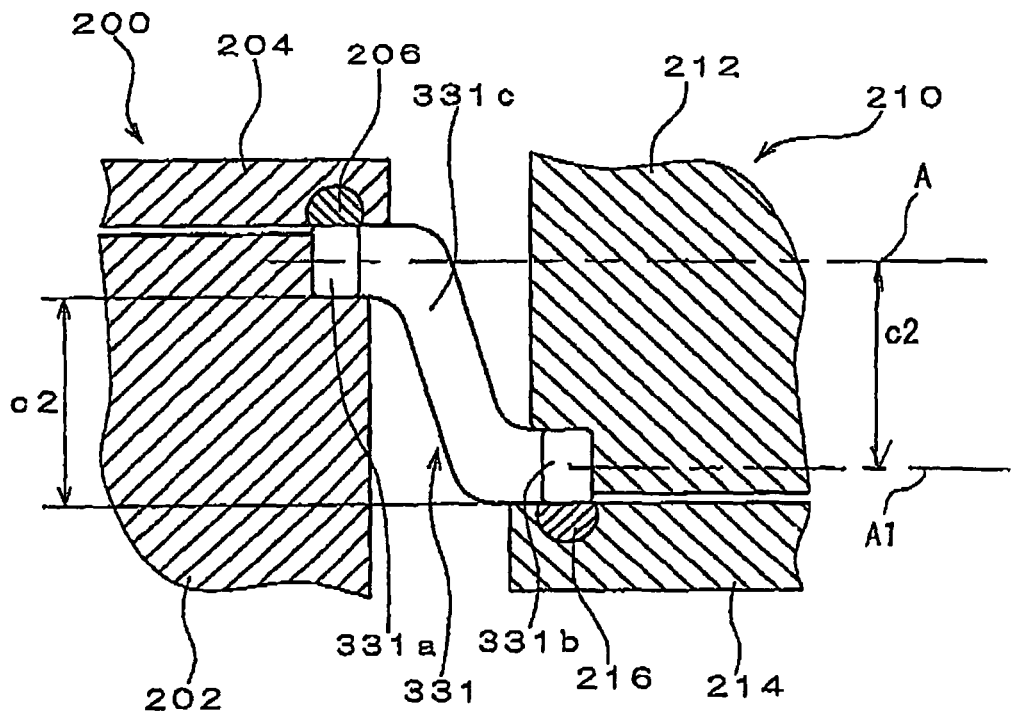
FIG. 21 is an enlarged partially cross sectional view schematically illustrating the one of the U-shaped conductor segments supported by the bending jig illustrated in FIG. 20 after being bent thereby.

FIG. 20, which corresponds to FIG. 17, schematically illustrates one of the U-shaped conductor segments 33 large-sized conductor segments 331) included in the second group before bending; this one of the U-shaped conductor segments 33 is supported by the bending jig BJ illustrated in FIG. 17. FIG. 21, which corresponds to FIG. 18, schematically illustrates the one of the U-shaped conductor segments 33 supported by the bending jig BJ illustrated in FIG. 20 after being bent thereby.

In FIGS. 20 and 21, an outer surface and one of opposed longitudinal side surfaces of the straight portion 331a of one of the U-shaped conductor segments 33 (331) correspond to the outer surface and the one of the opposed longitudinal side surfaces of the straight portion 332a of one of the U-shaped conductor segments 33 (332), respectively. Similarly, an outer surface and one of opposed longitudinal side surfaces of the straight portion 331b of one of the U-shaped conductor segments 33 (331) correspond to the outer surface and the one of the opposed longitudinal side surfaces of the straight portion 332b of one of the U-shaped conductor segments 33 (332), respectively.

Specifically, like the turn portion bending process applied to the conductor segment 332, the straight portion 331b securely supported by the movable damper 210 moves away from the first direction A with the movement of the whole movable clamper 210 so that the turn portion 331c of the one of the conductor segments 331 is bent (see FIGS. 20 and 21).

In the embodiment, the amount of bending, in other words, the whole movable clamper displacement is determined such that the distance between the one of the opposed longitudinal side surfaces of the straight portion 331a and the other of the opposed longitudinal side surfaces of the straight portion 331b is equivalent to the predetermined displacement length c2. That is, assuming that a second direction A1 passing through the center point of the end surface of the straight portion 331b in parallel to the first direction A is decided, the distance between the first and second directions A and A1 is set to the predetermined displacement length c2 (see FIG. 21).

The whole movable camper displacement is also determined such that the distance between the straight portion 331a and the straight portion 331b in the first direction A is equivalent to the slot pitch a of the stator core 1.

Twisting Process

After the turn portion bending process has been applied to all of the conductor segments 33 (331, 332) included in the first and second groups, a twisting process is applied to them.

Specifically, in the twisting process, at least one of the conductor segments 33 (331, 332) is twisted by moving the straight portions 33a (331a, 332a) and 33b (331b, 332b) away from each other. This results in that the first direction A of each of the straight portions 33a and the second direction A1 of each of the straight portions 33b are circumference aligned so that the straight portions 33a (331a, 332a) and 33b (331b, 332b) can be inserted in the slots 35 of the stator core 1.

In the embodiment, pairs of the conductor segments 33 (the large-sized conductor segment 331, the small-sized conductor segment 332) constituting the conductor segment sets are simultaneously twisted in a manner described herein below.

Figure 22:
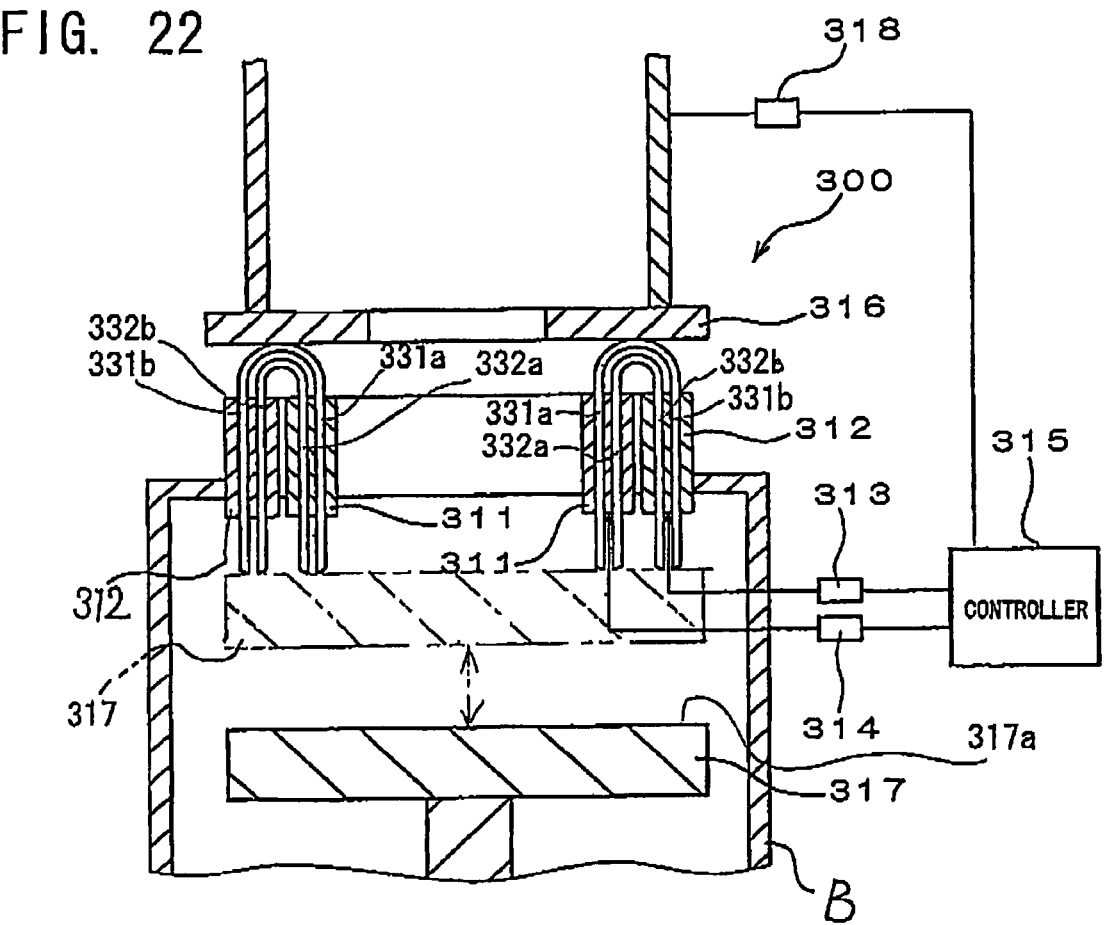
FIG. 22 is a partially cross sectional view schematically illustrating a twisting jig used for carrying out a twisting process.
Figure 23:
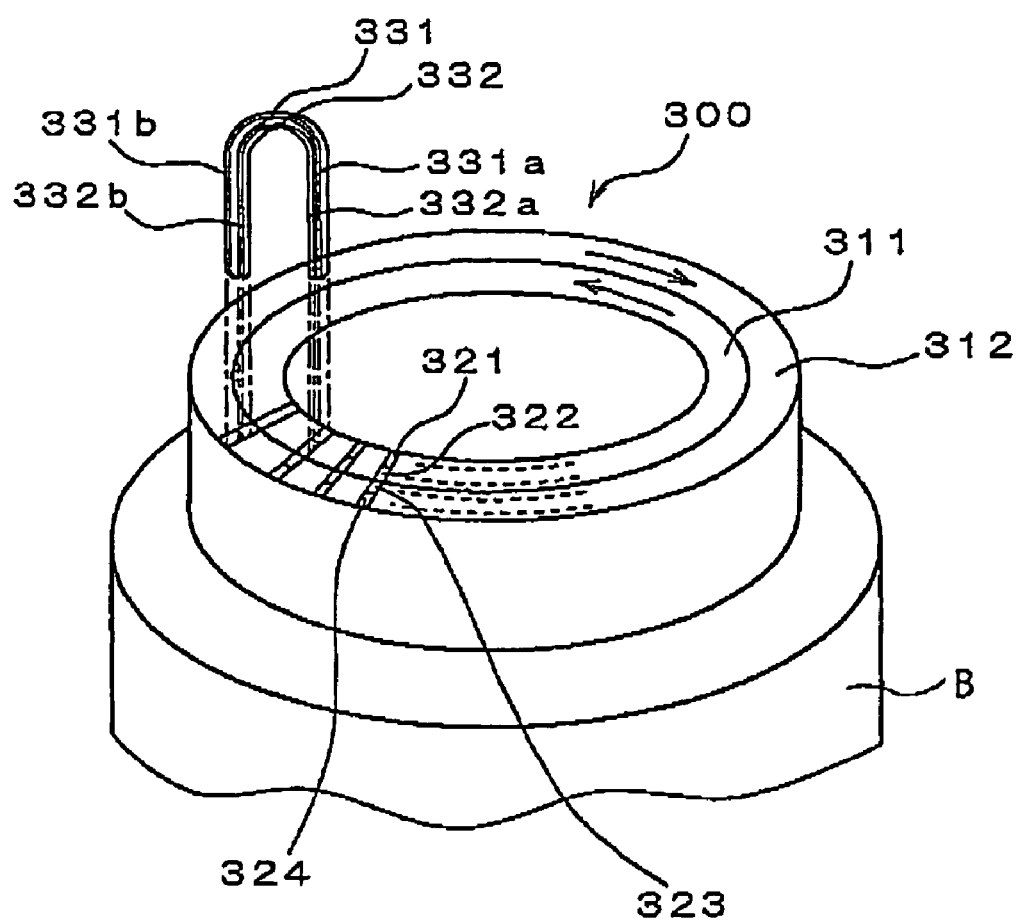
FIG. 23 is a perspective view schematically illustrating part of the twisting jig illustrated in FIG. 22.

FIG. 22 schematically illustrates a twisting jig 300 used for carrying out the twisting process, and FIG. 23 schematically illustrates part of the twisting jig 300 illustrated in FIG. 22.

As illustrated in FIGS. 22 and 23, the twisting jig 300 includes a substantially cylindrical base B with one opening end wall, and an inner annular twisting member 311 and an outer annular twisting member 312. The inner and outer annular twisting members 311 and 312 are coaxially fit in the one opening end wall of the base B such that they are rotatable relative to each other.

The twisting jig 300 also includes a first rotary drive mechanism 313 configured to rotatably drive the inner annular twisting member 311, and a second rotary drive mechanism 314 configured to rotatably drive the outer annular twisting member 312.

Moreover, the twisting jig 300 includes a controller 315, a segment press member 316, a segment holding jig 317 installed in the base B, and a hoisting and lowering mechanism 318.

The inner annular twisting member 311 has pairs of insertion holes 321 and 322 formed therein. The number of pairs of the insertion holes 321 and 322 is equivalent to that of the slots 35 of the stator core 1, and the pairs of the insertion holes 321 and 322 are arranged at regular intervals corresponding to the slot pitches of the stator core 1 in a circumferential direction thereof. The insertion holes 321 and 322 of each pair are arrayed in a corresponding radius direction of the inner annular twisting member 311. The insertion holes 321 and 322 of each pair allow the straight portions 331a and 332a of each segment set to be inserted therein such that the outer surfaces of the straight portions 331a and 332a are directed to the center axis of each of the twisting members 311 and 312.

Specifically, the plurality of the insertion holes 321 and that of the insertion holes 322, which are arranged at regular intervals in the circumferential direction of the inner annular twisting member 311, are concentrically arrayed.

Similarly, the outer annular twisting member 312 has pairs of insertion holes 323 and 324 formed therein. The number of pairs of the insertion holes 323 and 324 is equivalent to that of the slots 35 of the stator core 1, and the pairs of the insertion holes 323 and 324 are arranged at regular intervals corresponding to the slot pitches of the stator core 1 in a circumferential direction thereof. The insertion holes 323 and 324 of each pair are arrayed in a corresponding radius direction of the outer annular twisting member 312. The insertion holes 323 and 324 of each pair allow the straight portions 332b and 331b of each segment set to be inserted therein such that inner surfaces of the straight portions 331b and 332b, which are opposed to the outer surfaces thereof, are directed to the center axis of each of the twisting members 311 and 312.

Specifically, the plurality of the insertion holes 323 and that of the insertion holes 324, which are arranged at regular intervals in the circumferential direction of the outer annular twisting member 312, are concentrically arrayed. In an initial state of the twisting jig 300, the inner annular twisting member 311 and the outer annular twisting member 312 have a positional relationship such that the insertion holes 321 and 322 of each pair and the insertion holes 323 and 324 of each pair are radially aligned.

The controller 315 is electrically connected to the first and second rotary drive mechanisms 313 and 314 and operative to control them to determine the amount of rotation and the rotating direction of each of the twisting members 311 and 312.

The press member 316 has a substantially annular shape, and is placed above the inner and outer annular twisting member 311 and 312 coaxially therewith.

The hoisting and lowering mechanism 318 is electrically connected to the controller 315 and is configured to move the press member 316 up and down in the axial direction of each of the twisting members 311 and 312 based on control of the controller 315.

The segment holding jig 317 has a substantially disc shape, and a circular end surface 317a opposite to the inner and outer twisting members 311 and 312. The segment holding jig 317 is coaxially arranged with the inner and outer twisting members 311 and 312 such that the circular end surface 317a thereof is in parallel to a bottom surface of each of the twisting members 311 and 312.

In addition, the segment holding jig 317 is, for example, electrically connected to the controller 315 and is configured to move up and down based on control of the controller 315 in the axial direction of each of the twisting members 311 and 312.

In the twisting process, the straight portions 33b (slot-inserted portions 331b and 332b) of the large-sized and small-sized conductor segments 33 of one conductor segment set are inserted from their end surfaces into the insertion holes 324 and 323 of one pair of the outer annular twisting member 312, respectively.

Simultaneously with the insertion of the straight portions 33b into the insertion holes 324 and 323, the straight portions 33a (slot-inserted portions 331a and 332a) of the conductor segments 33 of the one conductor segment set are inserted from their end surfaces into the insertion holes 321 and 322 of one pair of the inner annular twisting member 311.

In the embodiment, the insertion holes 321 and 322 of the one pair into which the slot-inserted portions 331a and 332a of the one conductor segment set are inserted are circumferentially shifted, by one slot pitch of the twisting member 311, from the insertion holes 323 and 324 of the one pair into which the slot-inserted portions 331b and 332b of the same one conductor segment set are inserted.

After the large-sized conductor segments 331 and the small-sized conductor segments 332 of the conductor segment sets have been inserted into any of the insertion holes 321 to 324, the controller 315 controls the hoisting and lowering mechanism 318 to move the press member 316 downward toward the twisting members 311 and 312. This results in that the press member 316 abuts against the turn portion 311c of each of the large-sized segments 311 inserted in the insertion holes 321 and 324 of the twisting jig 300.

Simultaneously with the movement of the press member 316, the controller 315 controls to lift the segment holding jig 317 toward the inner and outer twisting members 311 and 312 so that the circular end surface 317a thereof abuts against the end surface of each of the straight portions 331a, 332a, 331b, and 332b.

Specifically, the press member 316 and the segment holding jig 317 regulate movement of the large-sized segments 331 and small-sized segments 332 inserted in the corresponding insertion holes in the axial direction of each hole.

While axial movements of the large-sized segments 331 and small-sized segments 332 inserted in the corresponding insertion holes are restricted, the inner twisting member 311 and the outer twisting member 312 are turned in opposite directions by the first and second rotary drive mechanisms 313 and 314 based on control of the controller 315. Specifically, the inner twisting member 311 and the outer twisting member 312 are turned in opposite directions such that the slot-inserted portions 331a and 332a and the slot-inserted portions 331b and 332b of each of the conductor segment sets are away from each other.

For example, as illustrated in FIG. 23, the inner twisting member 311 is rotated in counterclockwise direction by a predetermined amount of rotation, and the outer twisting member 312 is rotated in clockwise direction by a predetermined amount of rotation as they would be seen from above.

The rotations of the inner twisting member 311 and the outer twisting member 312 allow each straight portion of each of the conductor segments 33 (331, 332) of each conductor segment set to be twisted. This results in that the first direction A of each of the straight portions 33a and the second direction A1 of each of the straight portions 33b are circumferentially aligned while keeping constant the length c1 between the first direction A and the second direction A1.

In the embodiment, the distance between the straight portion 332a and the straight portion 332b of each small-sized conductor segment in the first direction A and that between the straight portion 331a and the straight portion 331b of each large-sized conductor segment in the first direction A are set to the slot pitch a of the stator core 1. For this reason, the controller 315 is configured to determine the amount of rotation of each of the twisting members 311 and 312 based on the distances.

Insertion Process

After completion of the twisting process with respect to the large-sized and small-sized conductor segments 331 and 332 of each conductor segment set, each of the conductor segments 33 (331 and 332) are removed from the inner and outer twisting members 311 and 312 of the twisting jig 300.

Thereafter, the conductor segments 33 (331 and 332) of each conductor segment set are inserted from the end surface of each straight portion thereof into corresponding slots 35 of the stator core 1. Specifically, the large-sized conductor segment 331 and the small-sized conductor segment 332 of each conductor segment set are inserted into corresponding slots 35 of the stator core 1 while they are arranged such that the large-sized conductor segment 331 surrounds the small-sized conductor segment 332 in each of the slots 35 (see FIG. 5).

This results in that the straight portions 33a and 33b of the conductor segments 33 are received in the corresponding slots 35 of the stator core 1 as the slot-inserted conductor portions 331a, 332a, 331b, and 332b, respectively. In addition, after insertion, the legs (projecting end portions) 331g and 331f of the large-sized conductor segments 331 and those 332g and 332f of the small-sized conductor segments 332 of each conductor segment set project from the other annular end surface of the stator core 1.

End Folding Process

Next, the projecting end portion 331f of each large-sized conductor segment 331 and the projecting end portion 332f of each small-sized conductor segment of each conductor segment set are circumferentially folded to be spread in opposite directions. Similarly, the projecting end portion 331g of each large-sized conductor segment 331 and the projecting end portion 332g of each small-sized conductor segment of each conductor segment set are circumferentially folded to be spread in opposite directions. A circumferentially angular interval between the projecting end portions 331f and 332f is equivalent to the one pole pitch of the motor 100, and similarly, a circumferential angular interval between the projecting end portions 331g and 332g is equivalent to the one pole pitch of the motor 100.

Such an end folding process has been well known in, for example, U.S. Pat. Nos. 6,833,648B2, 6,836,046B2, and 6,885,123 B2. Because all of the U.S. patents are assigned to the same assignee as that of this application, disclosures of these patents are incorporated herein by reference.

Joining Process

After completion of the end folding process, the tips of the projecting end portions 33a (331a, 332a) and 33b (331b, 332b) of the conductor segments 33 located to be radially adjacent to each other in each of the slots 35 are, as shown in FIGS. 1 and 3 joined to establish electrical connection therebetween. As joining means, welding, ultrasonic-welding, arc welding, brazing, or other similar means can be used. This joining process provides the stator coil 3 with the axial cross section illustrated in FIG. 1.

As described above, in each of the small-sized conductor segments 332 of the stator coil 3 according to the embodiment, as illustrated in FIGS. 7 to 10, the crank portion 332c1 is formed to radially shift one of the paired slant portions 332c2 and 332c3 from the other thereof by the predetermined displacement length c1. The length c1 is substantially equivalent to the radial width b1 of each of the paired slant portions 332c2 and 332c3.

The structure of each of the small-sized conductor segments 332 of the stator coil 3 prevents the coil ends thereof from being overlapped.

The structure of each of the small-sized conductor segments 332 of the stator coil 3 also makes it possible to limit the radial width of the turn portion 332c while maintaining the effect of the lap-less small-sized windings.

In addition to the effects set forth above, in each of the large-sized conductor segments 331 of the stator coil 3 according to the embodiment, as illustrated in FIGS. 11 to 13, the crank portion 331c1 is configured to radically shift one of the paired slant portions 331c2 and 331c3 from the other thereof by the predetermined displacement length c2. The predetermined displacement length c2 is designed to permit the crank portion 331c1 of each large-sized conductor segment 331 to substantially overlay the crank portion 332c1 of corresponding each small-sized conductor segment 332.

The structure of each of the large-sized conductor segments 331 of the stator coil 3 prevents the coil ends thereof from being overlapped.

The structure of each of the large-sized conductor segments 331 of the stator coil 3 also allows the radial width of the turn portion 331c to be limited while maintaining the effect of the lap-less large-sized windings.

These effects of the stator coil 3 with each of the large-sized and small-sized conductor segments 331 and 332 prevent the coil ends of the stator coil 3 from being radially expanding.

In the structure of the stator coil 3, as illustrated in FIGS. 6, 7, and 9, the crank portion 332c1 formed in the turn portion 332c of each small-sized conductor segment 332 and the crank portion 331c1 formed in the turn portion 331c of each large-sized conductor segment 331 are substantially circumferentially aligned with each other. This allows the turn portion 331c of each large-sized conductor segment of each conductor segment set to surround the turn portion 332c of each small-sized conductor segment thereof. This makes it possible to reduce interferences between the turn portions 331c and 332c.

Moreover, in the embodiments the lengths L1 and L2 of the paired slant portions 332c2 and 332c3 straightly extending from the ends of the crank portion 332c1 to the slot-inserted portions 332a and 332b are set to be substantially uniformed to each other. Similarly, the lengths L3 and L4 of the paired slant portions 331c2 and 331c3 straightly extending from the ends of the crank portion 331c1 to the slot-inserted portions 331a and 331b are set to be substantially uniformed to each other.

This allows an inclination of each of the slant portions 332c2 and 332c3 of each small-sized conductor segment 332 with respect to the other annular end surface of the stator core 1 to be small, as compared with cases where the lengths L1 and L2 are different from each other.

Similarly, the uniform of the lengths L3 and L4 permits an inclination of each of the slant portions 331c and 331c3 of each large-sized conductor segment 331 with respect to the other annular end surface of the stator core 1 to be small, as compared with cases where the lengths L3 and L4 are different from each other.

This results in that the lengths of the coil ends of the stator ST is reduced, making it possible to downsize the stator ST and the motor 100 installing it therein, and to reduce the resistance of each winding of the stator coil 3.

The crank portions 331c1 and 331c2 are formed by deforming part of the turn portion 33c of each individual U-shaped conductor segment 33 with no crank portions in a direction substantially perpendicular to an extending direction of the turn portion 33c. Specifically, deformation of only part of the turn portion 33c of each individual U-shaped conductor segment 33 with a simple shape allows formation of each U-shaped conductor segment 33 with any one of the crank portions 331c1 and 331c2. The crank portion forming process set forth above makes it possible to improve the productivity of conductor segments 33 with any one of the crank portions 331c1 and 331c2, as compared with another crank portion forming process of press-molding a plate-like conductor with a crank portion and of folding the press-molded conductor to form a turn portion therein.

In the embodiment, after deforming part of the turn portion 33c of each conductor segment 33 to form a crank portion in the turn portion 33c thereof, the straight portions of the pairs of the conductor segments 33 (the large-sized conductor segment 331, the small-sized conductor segment 332) constituting the conductor segment sets are simultaneously twisted. This results in that the first direction A1 of each of the straight portions 33a and the second direction A1 of each of the straight portions 33b of each conductor segment set 33 are circumferentially aligned while keeping constant the length c1 between the first direction A and the second direction A1.

Specifically, in the embodiment, the twisting process allows the conductor segments 33 whose straight portions 33a (331a, 332a) and 33b (331b, 332b) can be inserted in the slots 35 of the stator core 1 to be simultaneously produced, making it possible to improve the productivity of the conductor segments 33.

Figure 24:
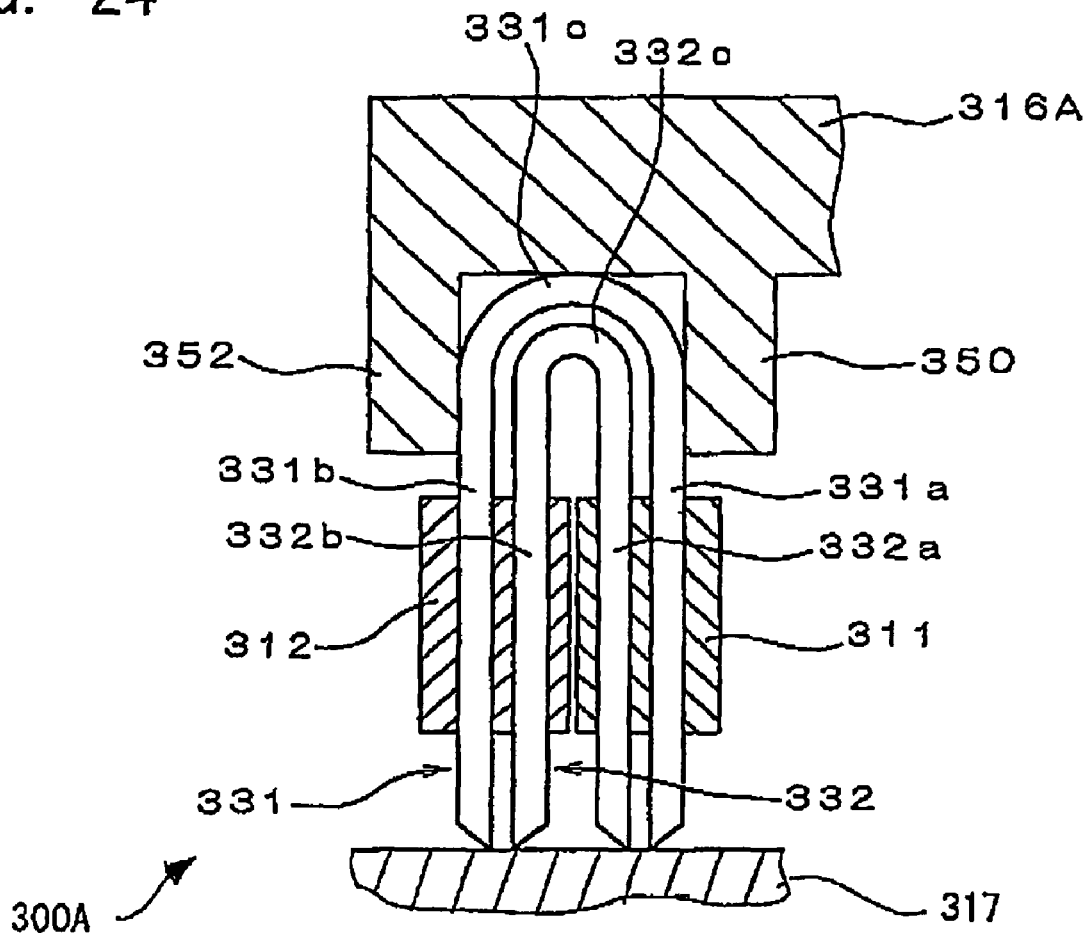
FIG. 24 is a partially cross sectional view schematically illustrating a modification of a twisting jig according to a modification of the embodiment.

In a modification of the embodiment, FIG. 24 schematically illustrates a twisting jig 300A whose segment press member is modified.

As illustrated in FIG. 24, the twisting jig 300A is provided with a segment press member 316A having a substantially annular shape. The segment press member 316A is provided at its peripheral portion with a pair of annular segment holding walls 350 and 352 axially projecting from a bottom surface of the press member 316A. The segment holding walls 350 and 352 have an annular holding groove allowing the turn portion 331c of each large-sized conductor segment 331 to be inserted to be fit therein. Other structures of the twisting jig 300A are substantially identical with those of the twisting jig 300, so that the descriptions of which are omitted.

In the modification, after the large-sized conductor segments 331 and the small-sized conductor segments 332 of the conductor segment sets have been inserted into any of the insertion holes 321 to 324, the controller 315 controls the hoisting and lowering mechanism 318 to move the segment press member 316A downward toward the twisting members 311 and 312. This results in that the turn portion 331c of each large-sized conductor segment 331 is inserted to be fit in the annular holding groove so that the turn portion 331c of each large-sized conductor segment 331 is fixedly clamped from their outer surfaces of the straight portions 331a and 331b thereof.

Other operations of the twisting jig 300A are substantially identical with those of the twisting jig 300, so that the descriptions of which are omitted.

Specifically, in the modification, if the amount of rotation of each twisting member is increased in the twisting process, the straight portions of each conductor segment inserted in the insertion holes 321 to 324 of the twisting members may be biased to radially move toward the center axis of each twisting member.

The segment press member 316A however allows limitation of the movement of each conductor segment, thereby preventing the turn portion (head portion) of each conductor segment from being inwardly radially moved during the twisting process. This can prevent, when the motor 100 uses the stator ST according to the embodiment, the turn portion of each conductor segment of the stator ST from easily interfering with the rotor 2.

In the embodiment, the circumferential position of the crank portion 332c1 formed in the turn portion 332c of each small-sized conductor segment 332 and that of the crank portion 331c1 formed in the turn portion 331c of each large-sized conductor segment 331 are substantially equal to each other. The circumferential position of the crank portion 332c1 of each small-sized conductor segment and that of the crank portion 331c1 of each large-sized conductor segment however can be circumferentially shifted from each other such that the circumferential shift amount is set within the slot pitch a of the stator core 1. The circumferential width of each of the crank portions 321c1 and 322c is set within the slot pitch a of the stator core 1. For this reason, limiting the circumferential gap between the crank portions 321c1 and 322c2 within a rage equivalent to the slot pitch a of the stator core 1 allows interference between the large-sized segments and the small-sized segments to be reduced.

In the embodiment, combinations of the large-sized conductor segments 331 and the small-sized conductor segments 332 constitute each of the first to third segment groups S1, S2, and S3. In the present invention, however, combinations of the large-sized conductor segments 331 and the small-sized conductor segments 332 can constitute only part of the first to third segment groups S1, S2, and S3, and the large-sized conductor segments 331 can constitute the remaining each of the first to third segment groups S1, S2, and S3.

Moreover, each conductor segment set can consist of the small-sized conductor segment (first conductor segment) 332, the large-sized conductor segment (second conductor segment) 331 surrounding it, and at least one large-sized conductor segment (a third conductor segment surrounding the whole of the first and second conductor segments 331 and 332. As set forth above, the crank portion of the second conductor segment 331 is configured to radically shift one of the paired slant portions 331c2 and 331c3 from the other thereof by the predetermined displacement length c2. The predetermined displacement length c2 allows the crank portion 331c1 of the second conductor segment 331 to substantially overlay the crank portion 332c1 of the corresponding first conductor segment 332.

In the modification, a crank portion of the third conductor segment is configured to radially shift one of paired slant portions thereof from the other of the paired slant portions by a predetermined displacement length c3. The predetermined displacement length c3 allows the crank portion of the third conductor segment to substantially overlay the whole of the crank portion of the corresponding first conductor segment 332 and the crank portion of the corresponding second conductor segment 331.

Specifically, in the modification, the predetermined displacement length c3 is given by "$c3=2\times(b1+b2)+b3$" where b3 represents a radial width of each of the paired slant portions of the third conductor segment. In addition, the crank portion of the third conductor segment has a width d3 in the circumferential direction of the slot core 1; this width d3 is designed to be kept within the slot pitch a of the stator core 1.

As described above, in the modification, combinations of three or more conductor segments can constitute each conductor segment set while keeping a radial width of each of the three or more conductor segments short.

Furthermore, in the embodiment, the production procedures of the stator coil 3 of the stator ST used for motors are described, but the present invention ca be applied to cases of producing stator coils of stators used for other types of rotary electric machines, such as alternators.

In the embodiment set forth above, movement of the pair of straight portions 33a and 33b of one of the segments 33 allows the turn portion 33c thereof to be deformed (bent), but the present invention is not limited to the manner. Specifically, as another turn portion bending process, the turn portion 33c of one of the segments 33 can be directly deformed. For example, the turn portion 33c of one of the segments 33 is pressed from both inner and outer surface sides thereof by holding jigs (molds) that have a shape corresponding to the shape of the turn portion 33c after the turn portion bending process. Direct press mold against the turn portion to bend it allows the straight portions of the turn portion to be securely moved to the predetermined relative radial positions, respectively.

As described using FIGS. 12 and 13, in the embodiment, the circumferential width d2 of the crank portion 331c1 included in the large-sized conductor segment 331 is set within the slot pitch a of the stator core 1. The circumferential width d2 of the crank portion 331c1 however can be set to not less than the slot pitch a of the stator core 1. As described above, because the circumferential width d1 of the crank portion 332c1 included in the small-sized conductor segment 332 is set is within the slot pitch a of the stator core 1, it is possible to prevent the small-sized conductor segments 332 circumferentially adjacent to each other from interfering with each other. The crank portion 332c1 included in the small-sized conductor segment 332 is formed by radially shifting one of the paired slant portions 332c2 and 332c3 from the other thereof by the radial width b1 of each of the paired slant portions 332c2 and 332c3. For this reason, keeping inclination of the crank portion 332c1 with respect to a corresponding radial direction within one slot pitch a of the stator core 1 allows interferences between the small-sized conductor segments 332 circumferentially adjacent to each other to be prevented.

Specifically, the crank portion 331c1 is formed by radially shifting one of the paired slant portions 331c2 and 331c3 from the other thereof by the predetermined displacement length of "3× the radial width b2 of each of the paired slant portions 331c2 and 331c3".

Figure 25:
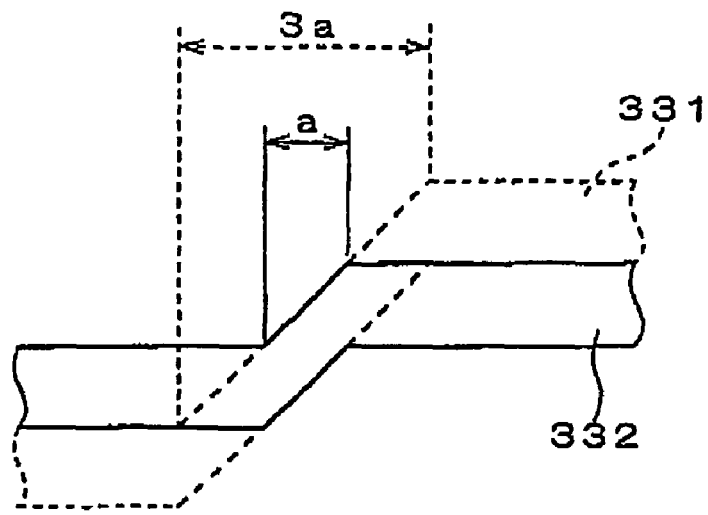
FIG. 25 is an enlarged view schematically illustrating a relationship between a small-sized conductor segment and a large-sized conductor segment when inclinations of crank portions with respect to corresponding radial directions are kept within one pitch and three slot pitch of the stator core, respectively.

For this reason, to keep inclination of the crank portion 331c1 with respect to a corresponding radial direction, which is equivalent to that of the crank portion 332c1 with respect to the corresponding radial direction, it is necessary to maintain inclination of the crank portion 331c1 with respect to the corresponding radial direction within three slot pitch 3a of the stator core 1. FIG. 25 schematically illustrates a relationship between a small-sized conductor segment 332 and a large-sized conductor segment 331 when inclinations of the crank portions 332c1 and 331c1 with respect to the corresponding radial directions are kept within one slot pitch a and three slot pitch 3a of the stator core 1, respectively.

Let us think this modification is applied to the structure of the stator coil 3 in which each conductor segment set consists of the first conductor segment 332, the second conductor segment 331, and the at least one third conductor segment surrounding the whole of the first and second conductor segments 331 and 332.

In this application, the crank portion of the third conductor segment has a circumferential width set to not more than a value obtained by "{2×the number of segments overlaid by the third conductor segment+1}×the slot pitch α". The predetermined displacement length c3a can prevent the large-sized conductor segments circumferentially adjacent to each other from interfering with each other.

Still furthermore, in the embodiment, the turn portion of each of the conductor segments 33 (331, 332) of one conductor segment set connects the corresponding straight conductor portions without kinks, but the turn portion of any one of the conductor segments 33 can connect the corresponding straight conductor portions with twisting.

Figure 26:
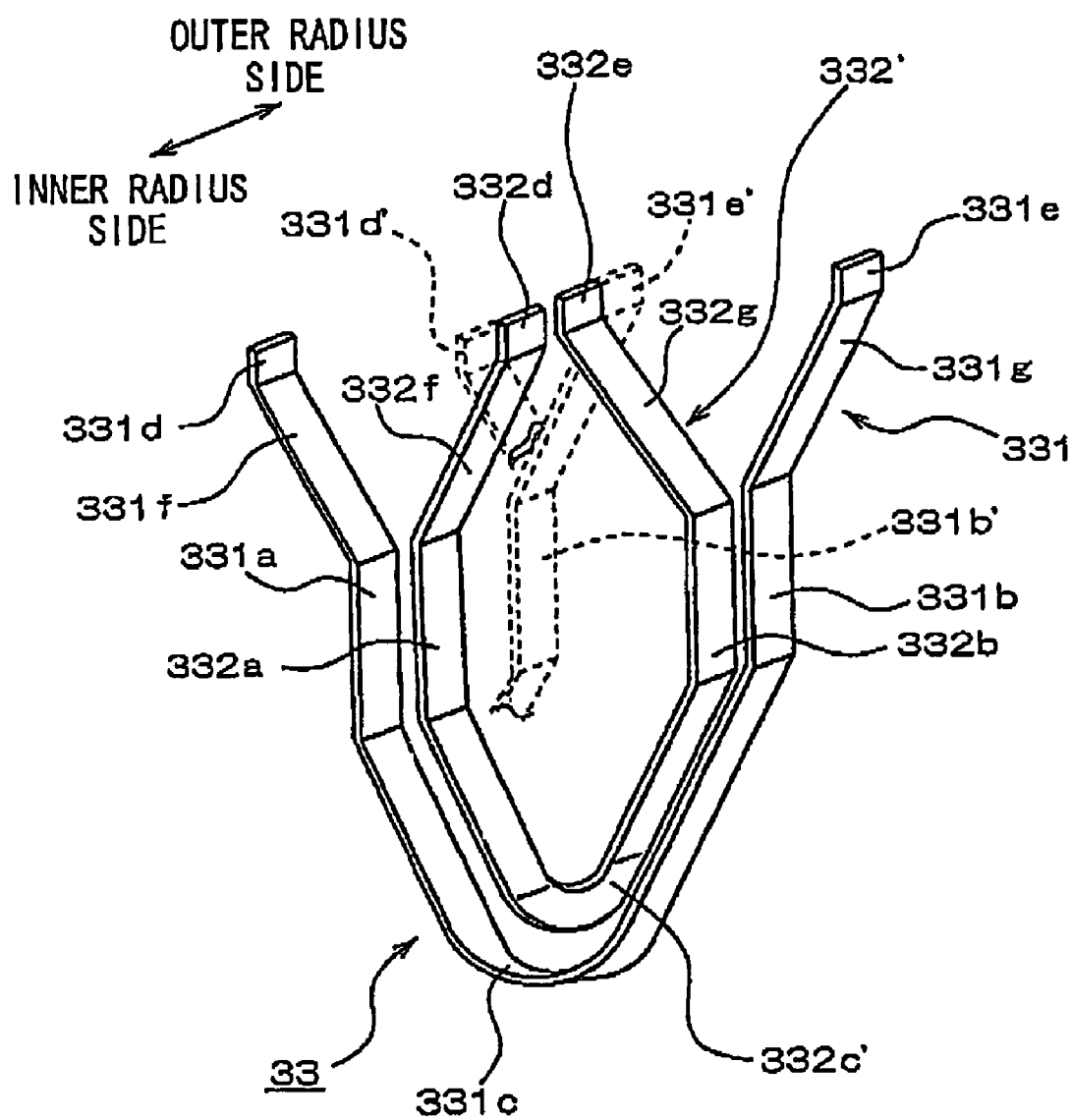
FIG. 26 is an enlarged perspective view schematically illustrating one conductor segment set consisting of a large-sized conductor segment and a small-sized conductor segment whose turn portion connects corresponding straight conductor portions with twisting according to a modification of the embodiment
Figure 1:
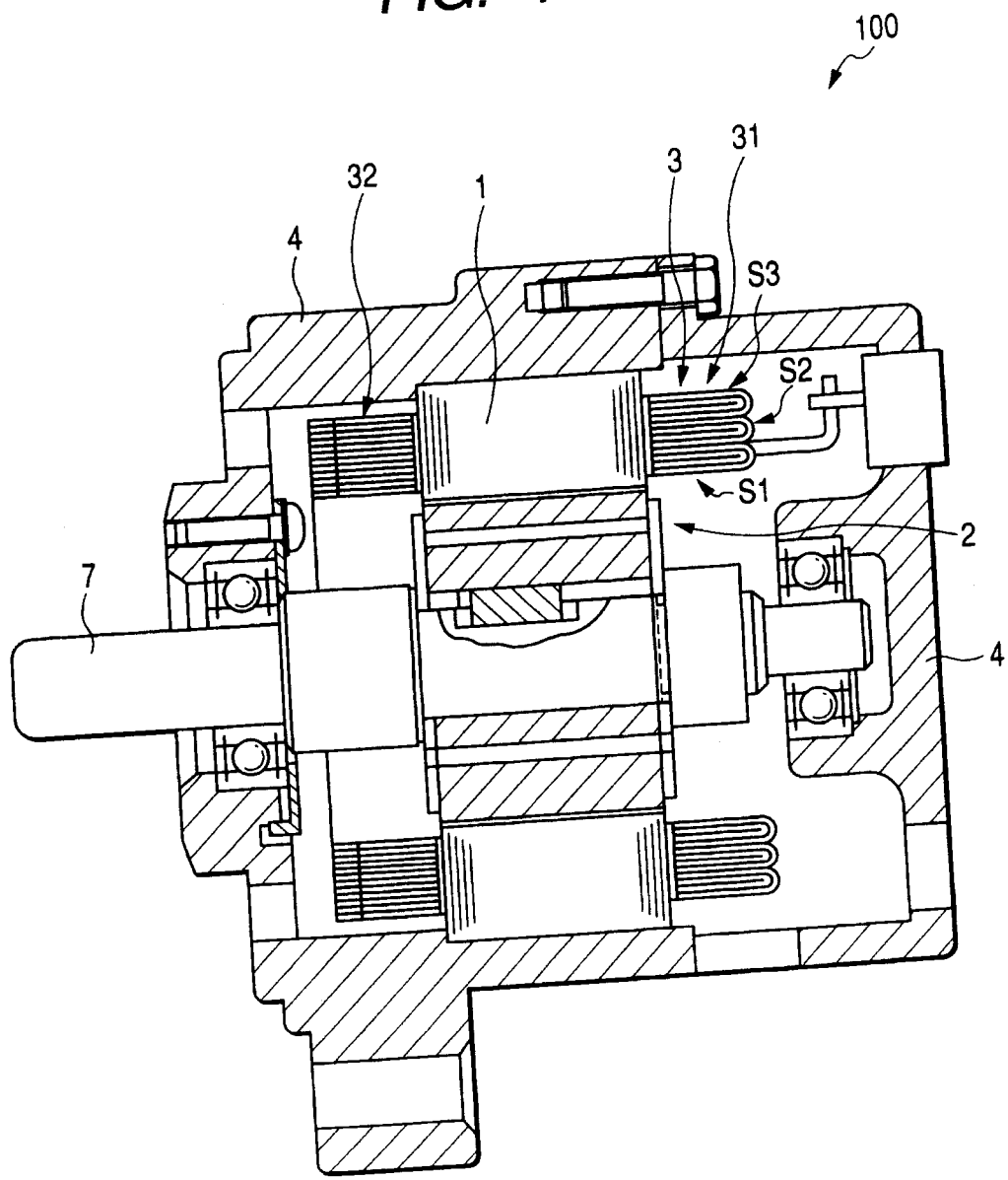
Figure 2:
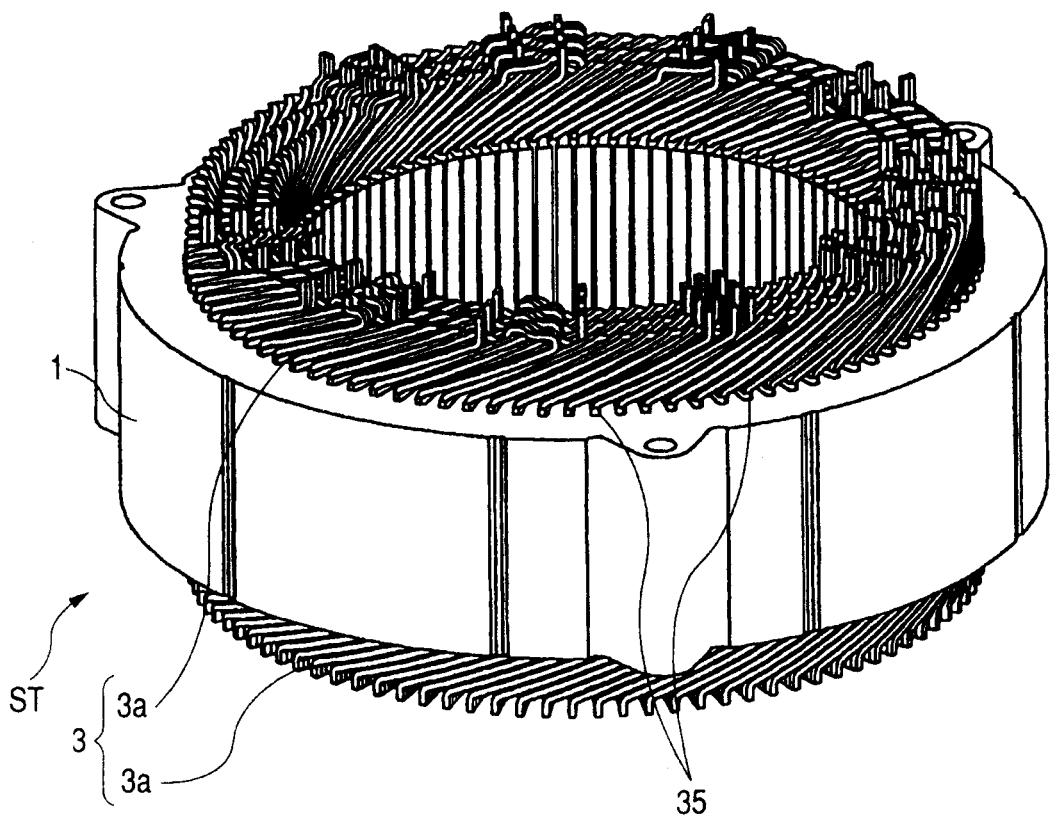
Figure 3:
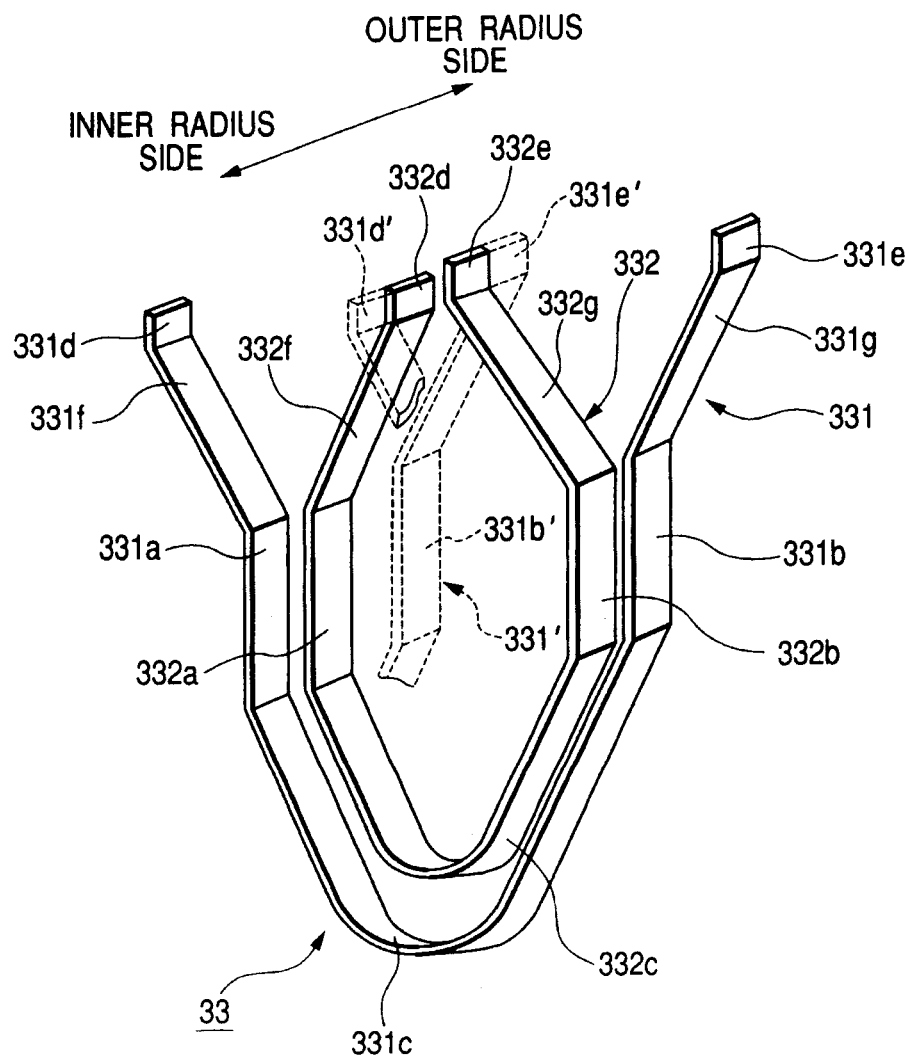
Figure 4:
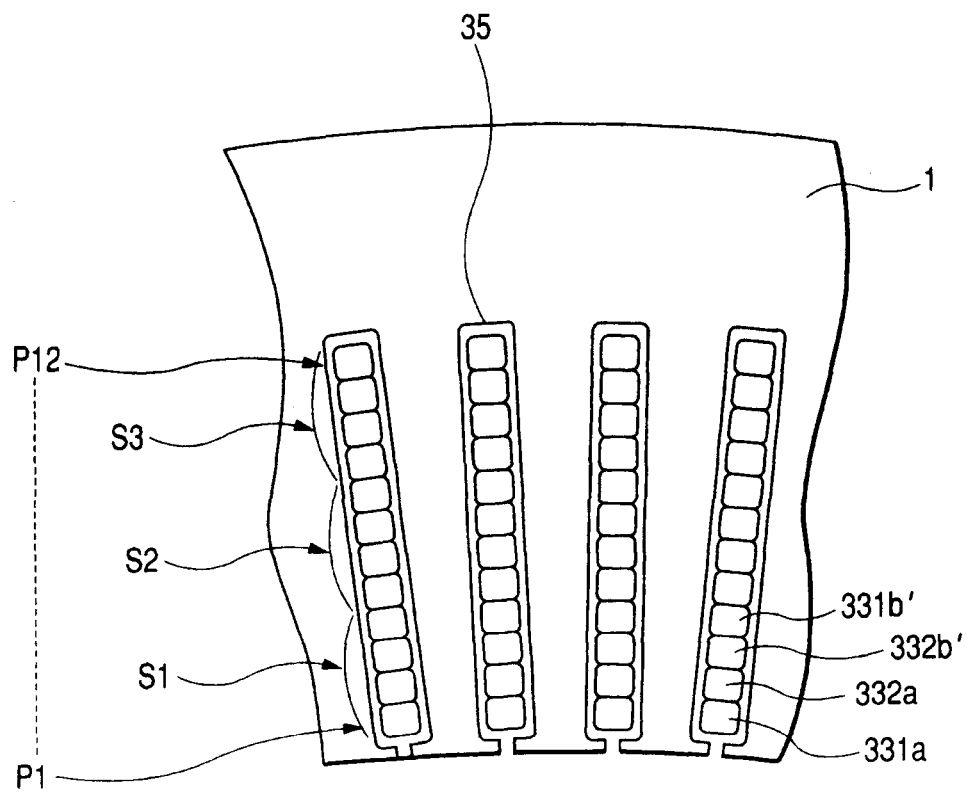
Figure 5:
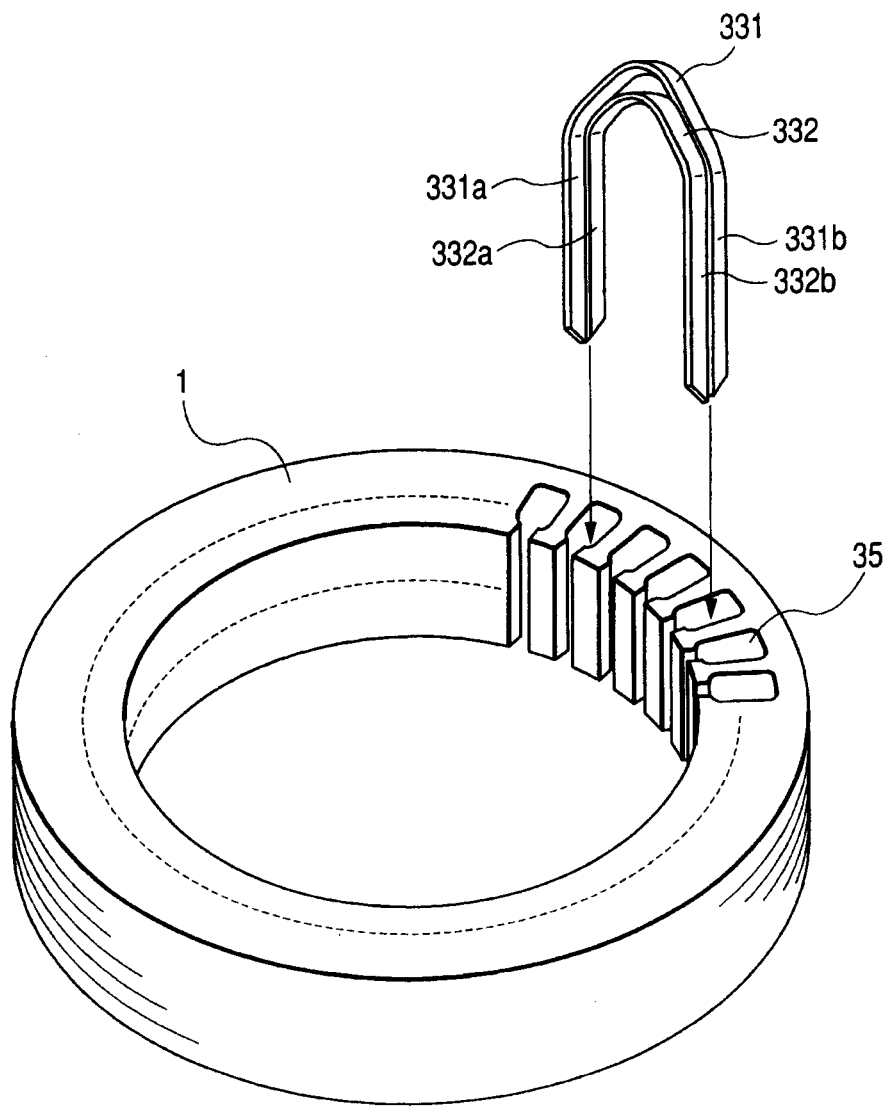
Figure 6:
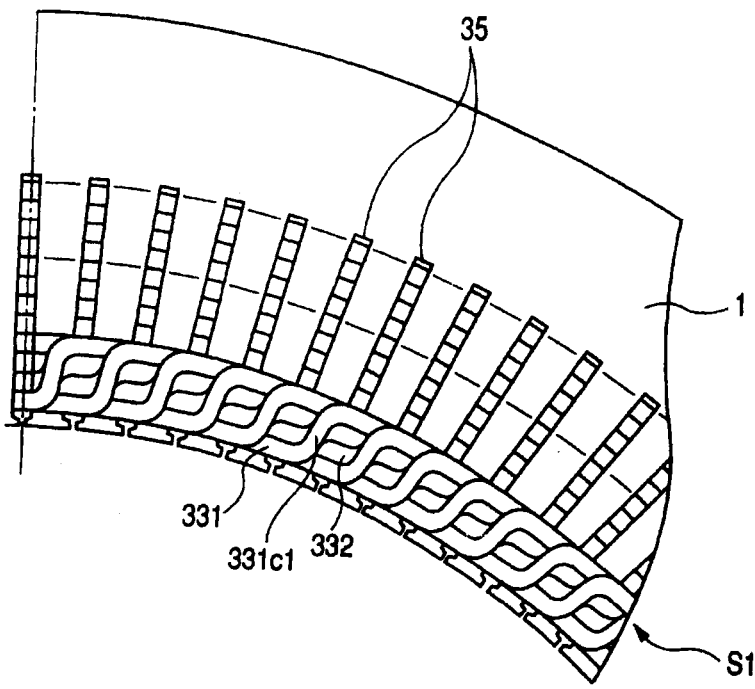
Figure 7:
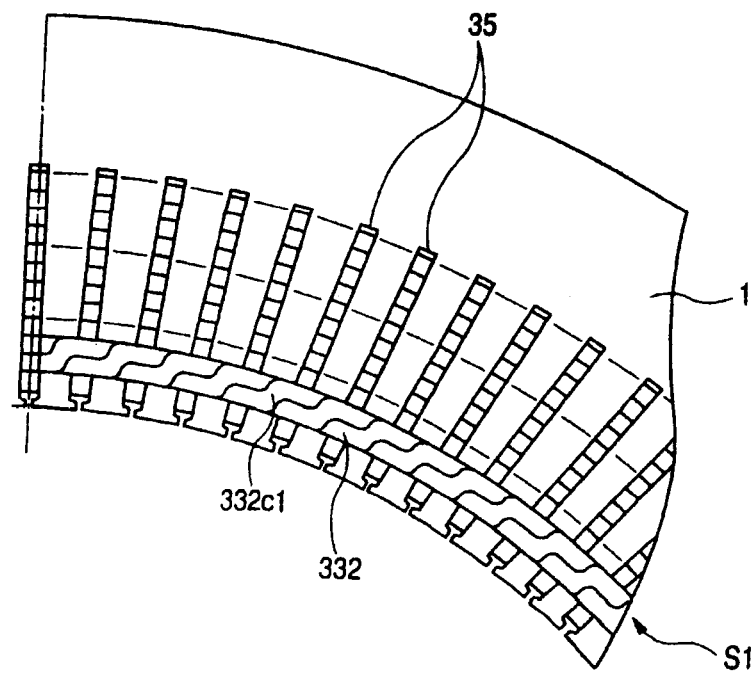
Figure 8:
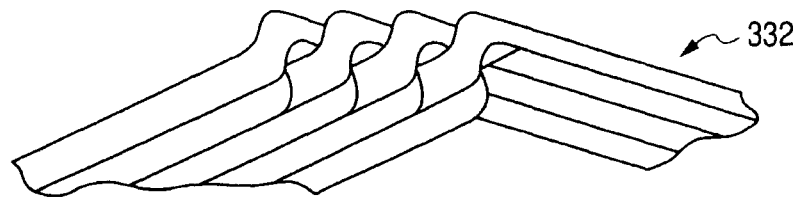
Figure 9:
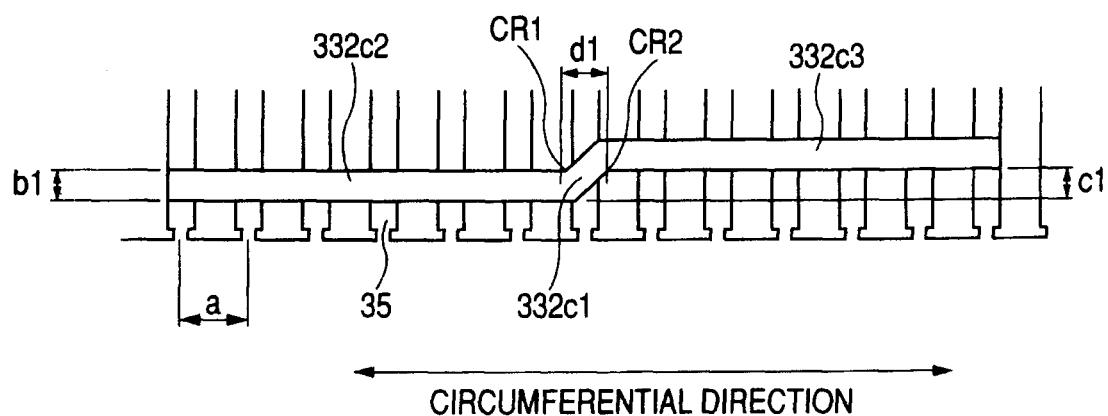
Figure 10:
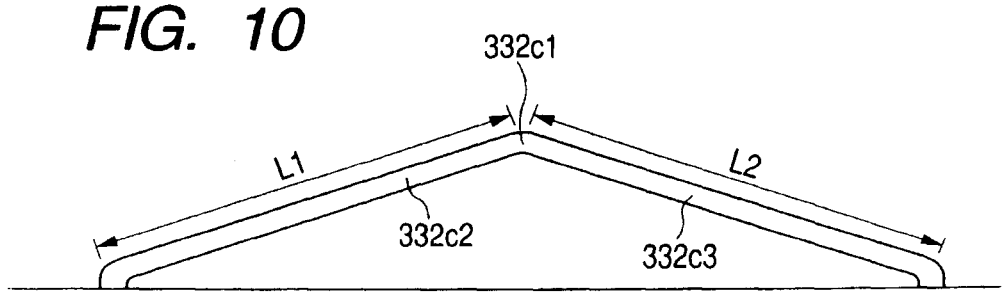
Figure 11:
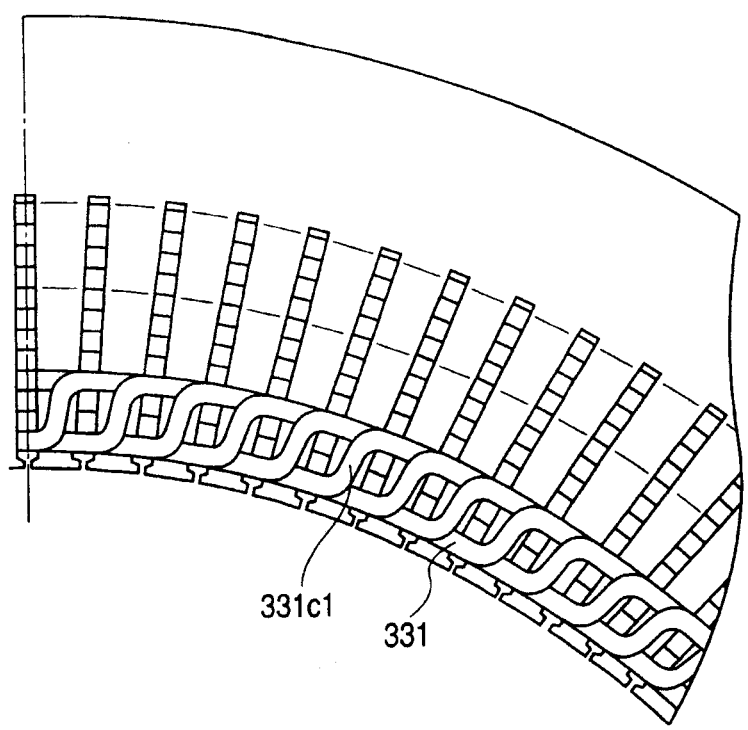
Figure 12:
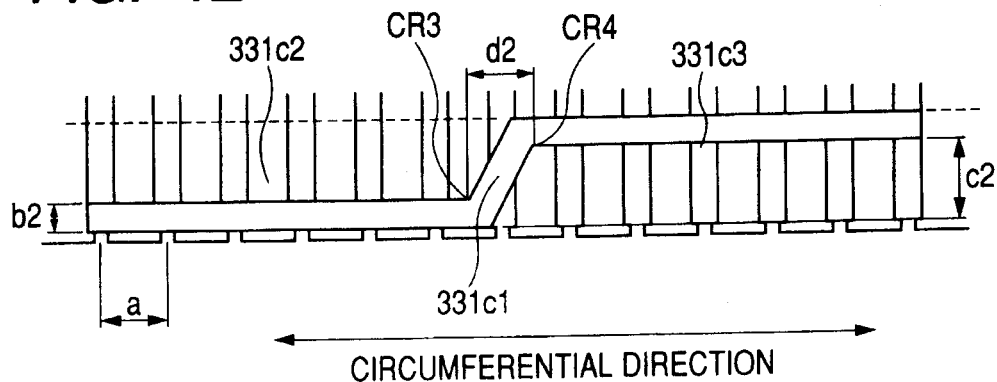
Figure 13:
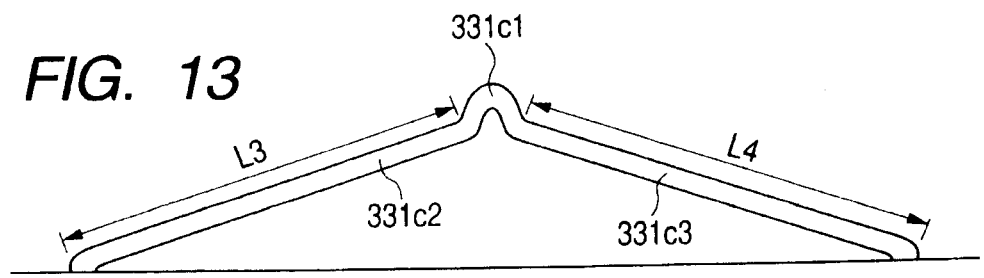
Figure 14:
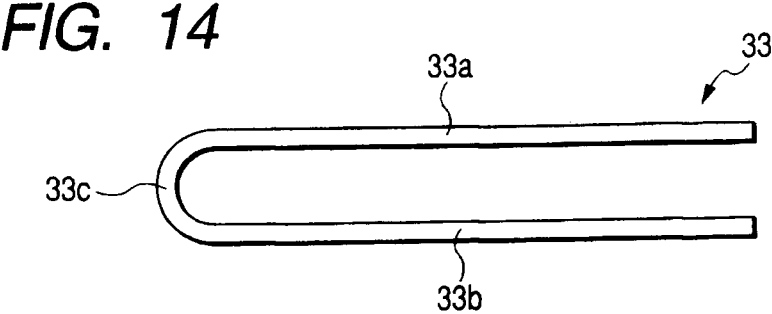
Figure 15:
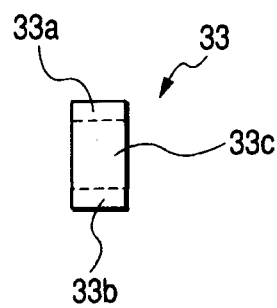
Figure 16:
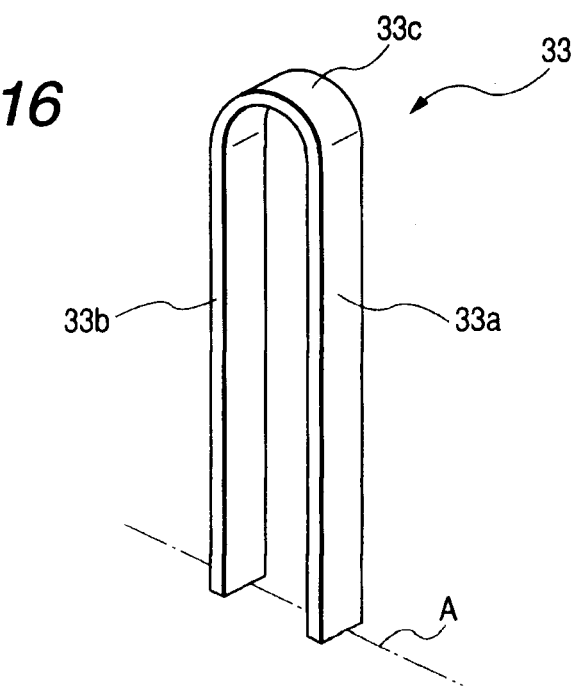
Figure 17:
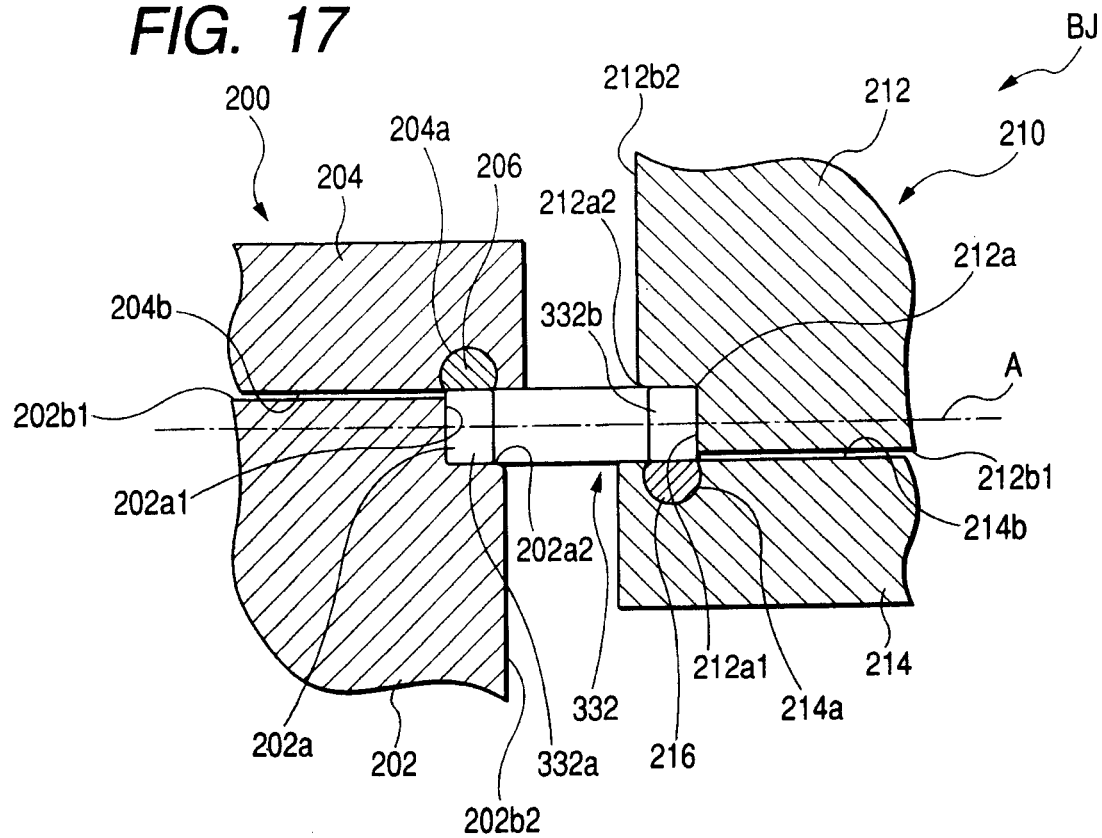
Figure 18:
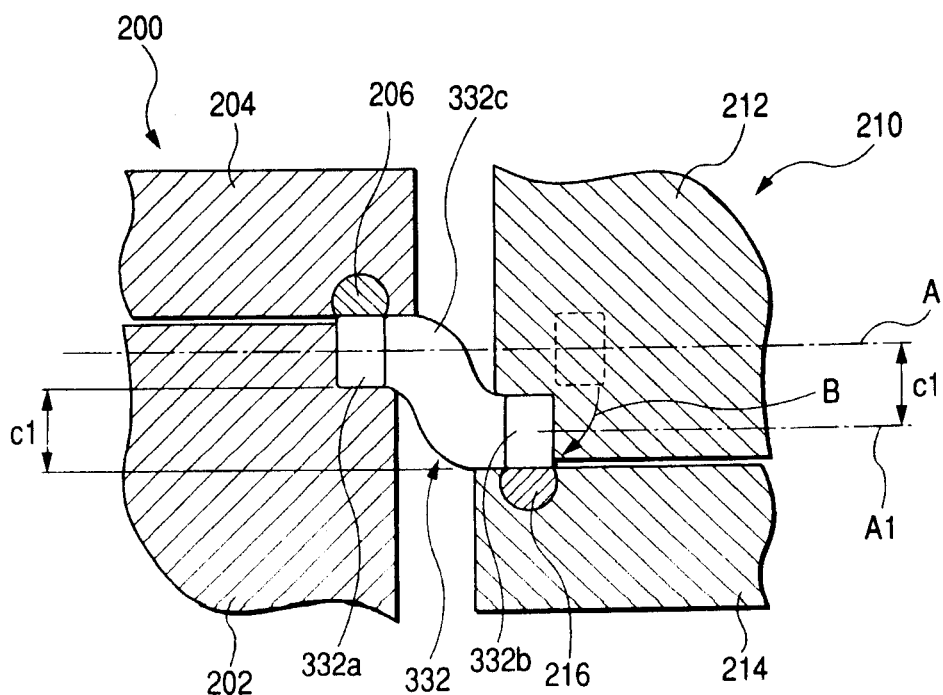
Figure 19:
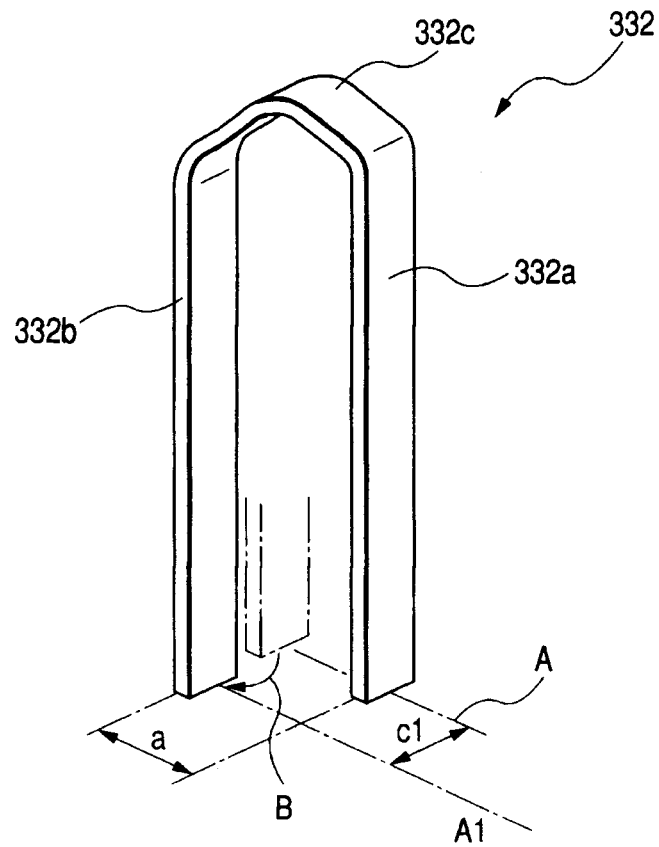
Figure 20:
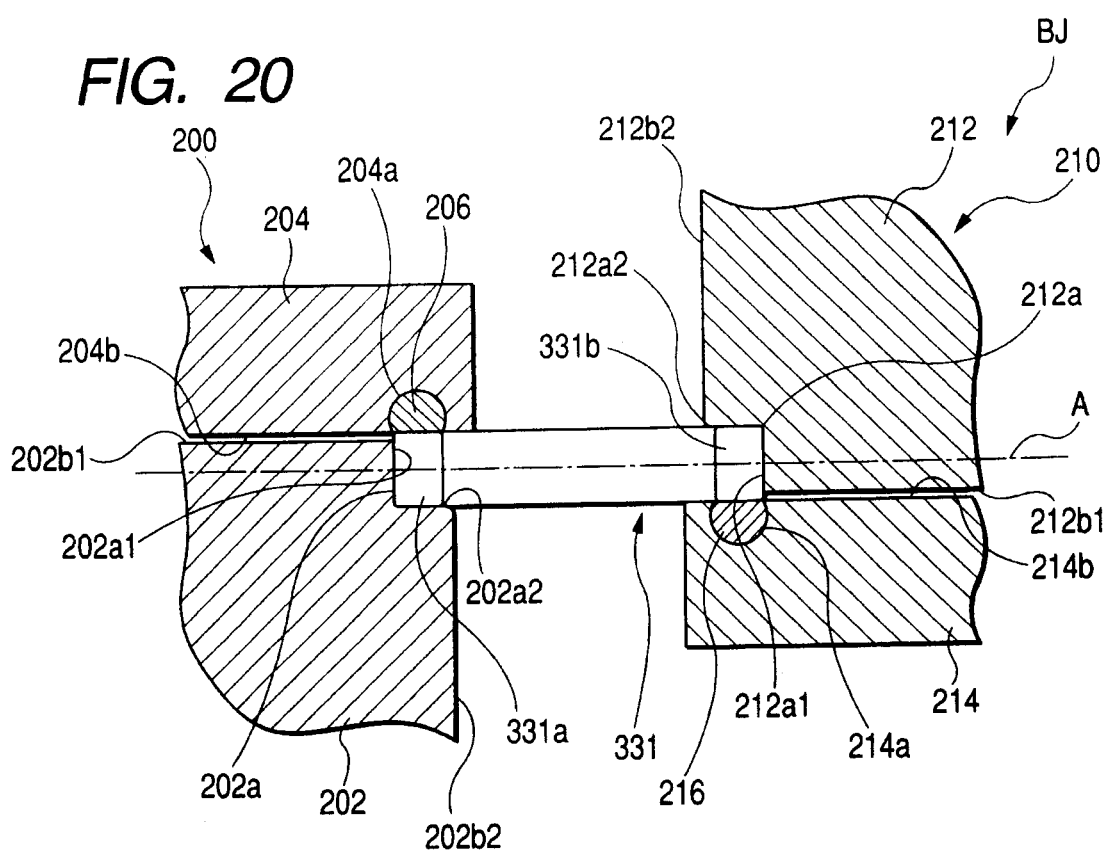
Figure 21:
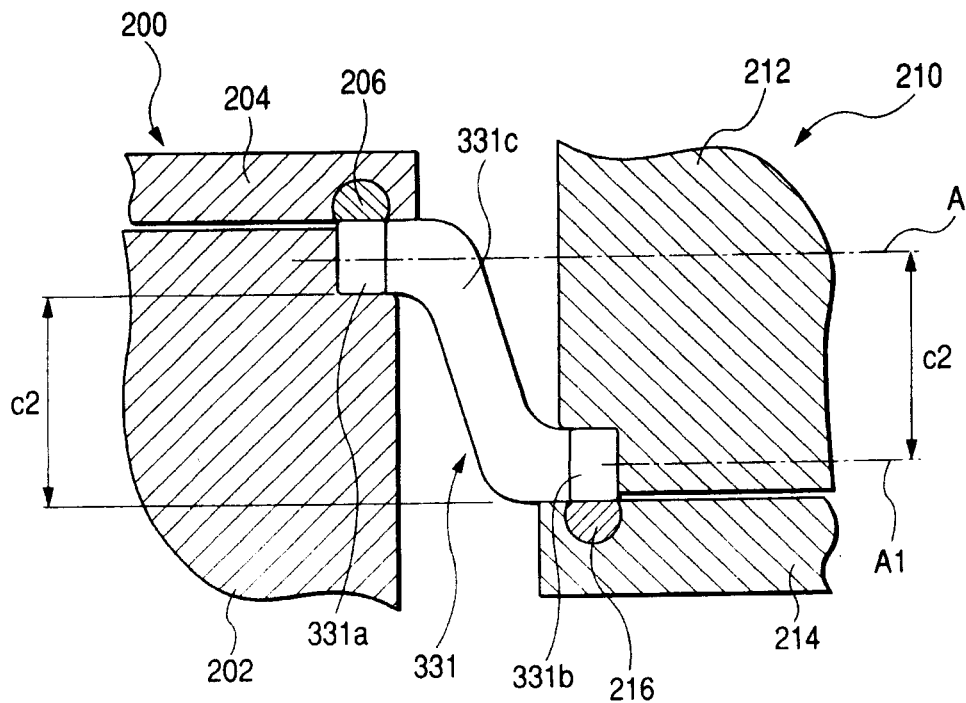
Figure 22:
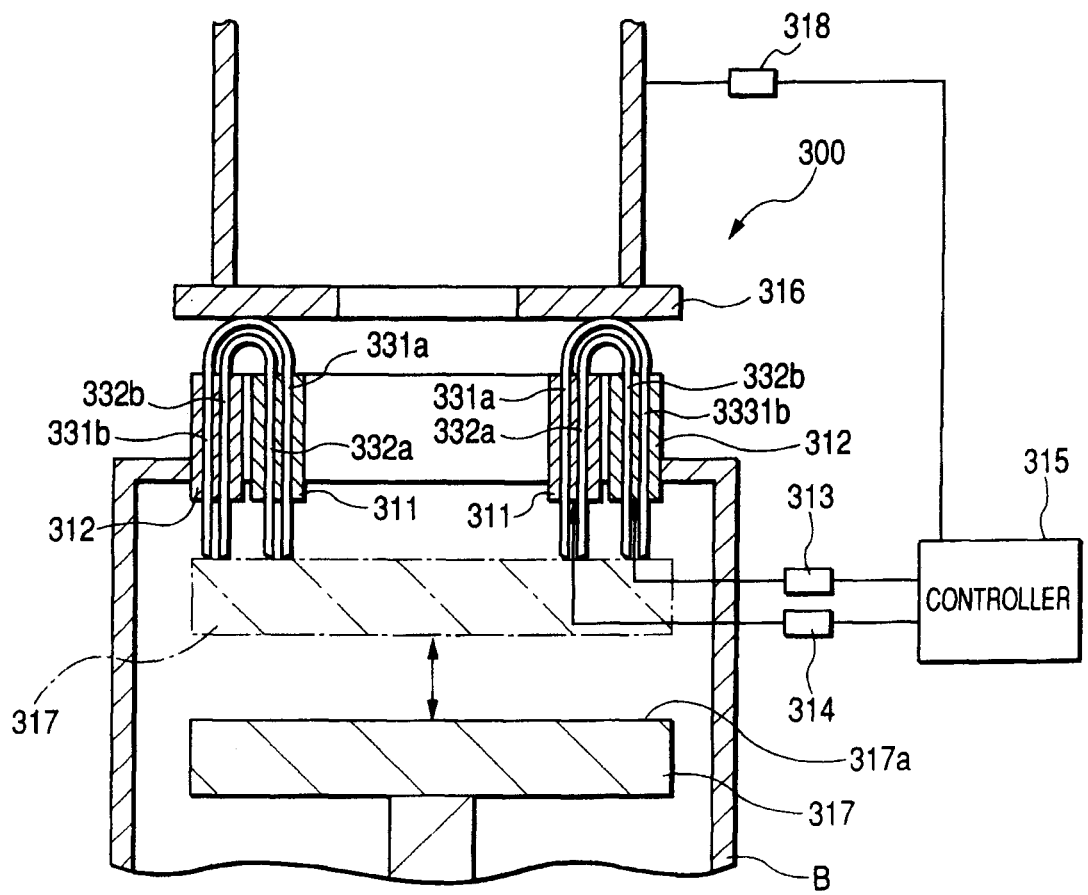
Figure 23:
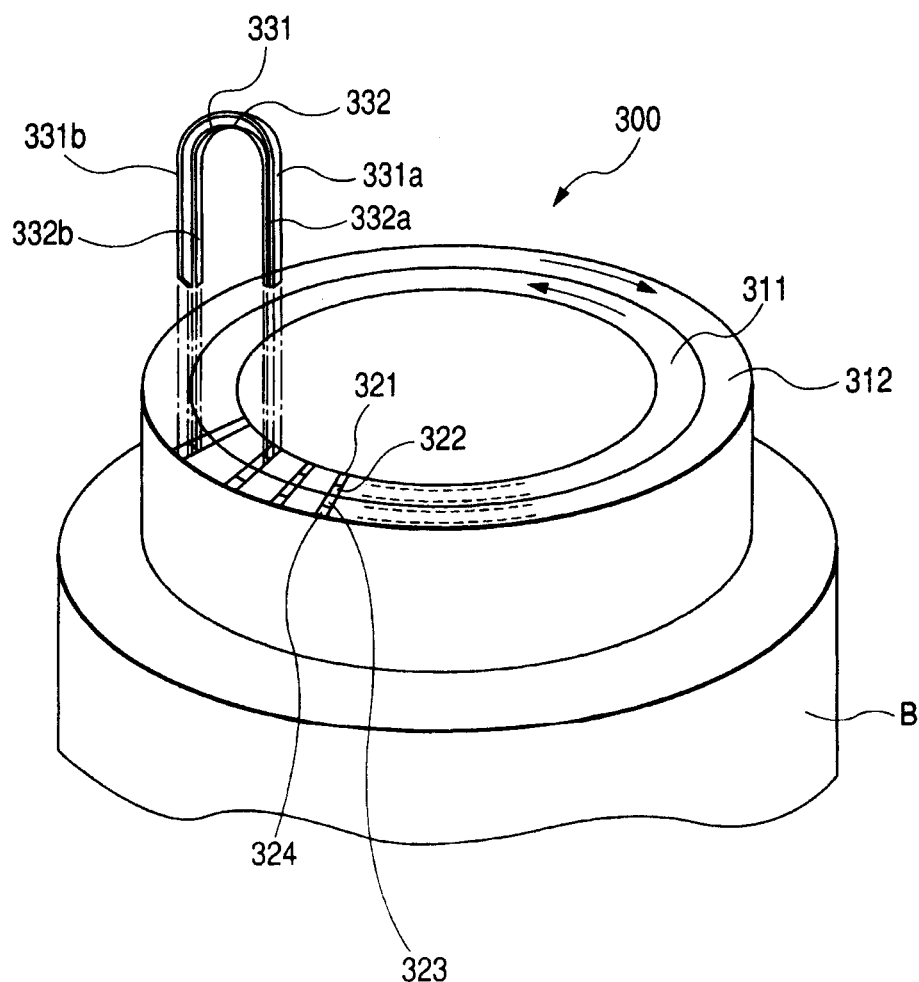
Figure 24:
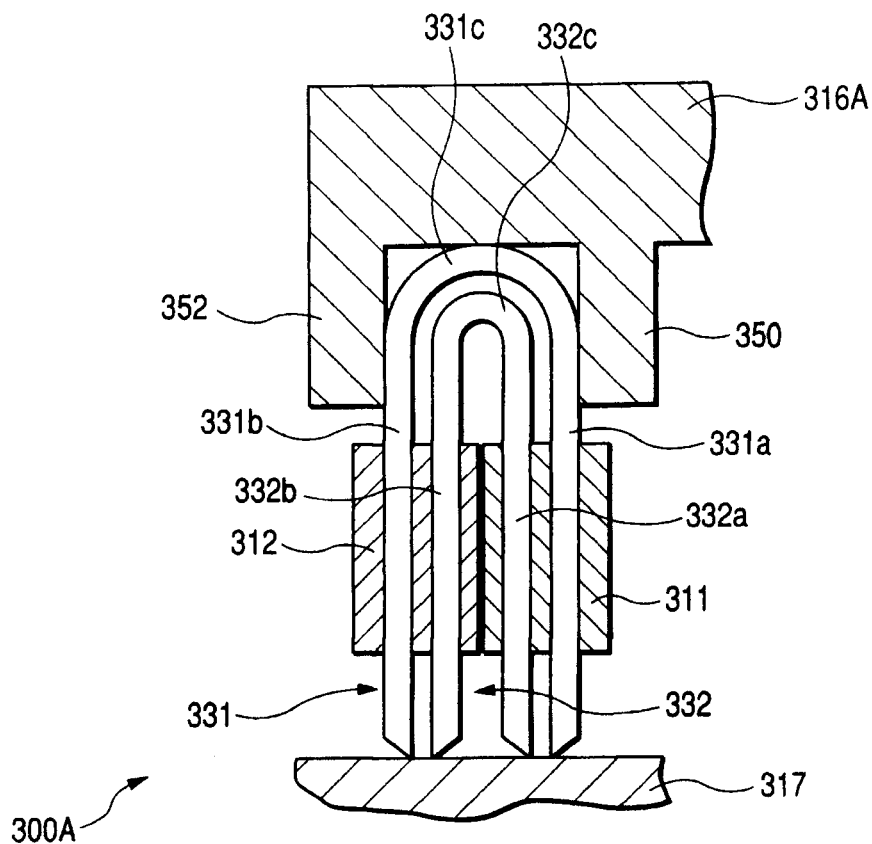
Figure 25:
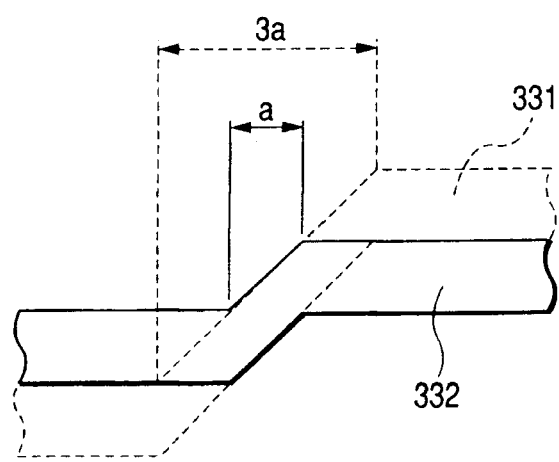
Figure 26:
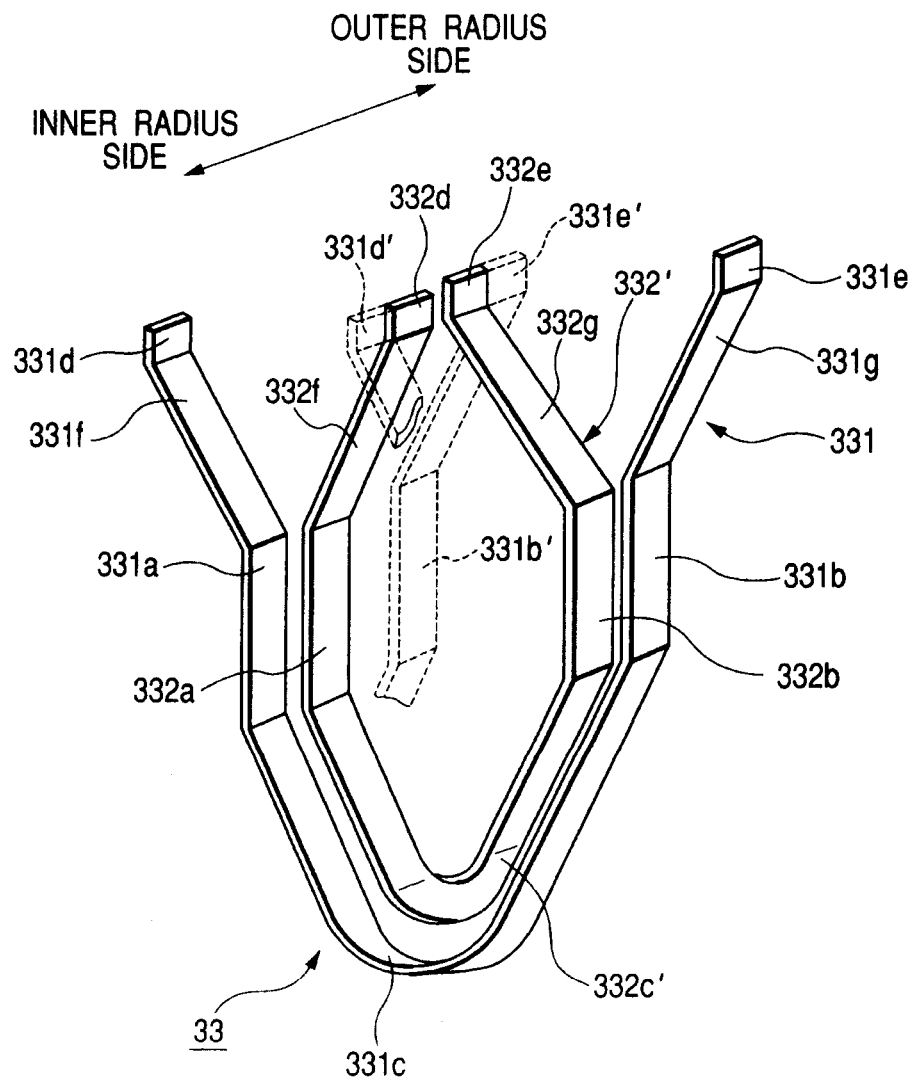

FIG. 26 schematically illustrates one conductor segment set consisting of a large-sized conductor segment 331 and a small-sized conductor segment 332' whose turn portion connects the corresponding straight conductor portions with twisting.

Specifically, the small-sized conductor segment 332' includes a turn portion 332c' connecting both the paired straight conductor portions 332a and 332b with twisting. In this structure, the conductor segment extending direction at the turn portion 331c of the large-sized conductor segment 331 and that at the turn portion 332c' of the small-sized conductor segment 332 are substantially different at an angle of 90 degrees. This allows a wide clearance between the turn portions 331c and 332c' to be secured, making it possible to reduce interferences between the conductor segments constituting each conductor segment set. When each conductor segment set consists of one small-sized conductor segment and two or more large-sized conductor segments described above, it is possible to replace the turn portion of at least one of large-sized conductor segments into a turn portion with twisting.

While there has been described what is at present considered to be the embodiment and modifications of the present invention, it will be understood that various modifications which are not described yet may be made therein, and it is intended to cover in the appended claims all such modifications as fall within the true spirit and scope of the invention.

What is claimed is:

1. A rotary electric machine comprising:
   a stator core having a plurality of slots circumferentially arranged at given intervals, a circumferential interval of adjacent slots defining a slot pitch; and
   a stator coil, the stator coil comprising:
      a plurality of sets of at least first and second segments each having a substantially U-shape, the second segment being larger than the first segment, each of the first and second segments being formed by a single wire conductor having opposing first and second surfaces, the single wire conductor including a pair of straight conductor portions and a turn portion continuously connecting the paired straight conductor portions, one of the paired straight portions of each of the first and second segments of each of the sets being inserted in one of the plurality of slots, the other of the paired straight portions being inserted in another one of the plurality of slots such that the second segment overlays the first segment, the turn portion of the first segment of each of the sets including a pair of slant portions configured to continuously extend from the paired straight portions, and a tip portion continuously joining the paired slant portions, the tip portion including a first crank portion, the first crank portion being configured to radially shift one of the paired slant portions from the other of the paired slant portions by a first length such that:
   the first surface of the single wire conductor, constituting one surface of each of the paired slant portions and the tip portion of the first segment, is arranged to face the stator core, and
   the second surface of the single wire conductor, constituting the other surface of each of the paired slant portions and the tip portion of the first segment, is arranged opposing the first surface,
   the turn portion of the second segment of each of the sets including a pair of slant portions configured to continuously extend from the paired straight portions thereof, and a tip portion continuously joining the paired slant portions thereof, the tip portion including a second crank portion, the second crank portion being configured to radially shift one of the paired slant portions from the other of the paired slant portions by a second length such that:
   the first surface of the single wire conductor, constituting one surface of each of the paired slant portions and the tip portion of the second segment, is arranged to face the stator core,
   the second surface of the single wire conductor, constituting the other surface of each of the paired slant portions and the tip portion of the second segment, is arranged opposing the first surface,
   the first length being substantially equivalent to a radial width of the turn portion of the first segment of each of the sets, the second length being determined to allow the second crank portion of the second segment of each of the sets to substantially overlay the first crank portion of the first segment of each of the sets, and
   wherein the first crank portion of the first segment of each of the sets has a first inclination with respect to a corresponding radial direction of the stator core and the second crank portion of the second segment of each of the sets has a second inclination with respect to a corresponding radial direction of the stator core, the first inclination being identical to the second inclination.

2. A rotary electric machine according to claim 1, wherein the second length is obtained by the sum of a double of a radial width of the turn portion of the first segment of each of the sets and a radial width of the turn portion of the second segment of each of the sets.

3. A rotary electric machine according to claim 1, wherein the first crank portion has a circumferential width, the circumferential width of the first crank portion being not more than the slot pitch.

4. A rotary electric machine according to claim 1, wherein the second crank portion has a circumferential width, the circumferential width of the second crank portion being set to not more than a value V obtained by the following equation:

$$V = (2 \times N + 1) \times a$$

where N represents the number of segments overlaid by the second segment, and a represents the slot pitch.

5. A rotary electric machine according to claim 1, wherein a circumferential width of the first crank portion of the first segment of each of the sets is set to be greater than a circumferential width of the second crank portion of the second segment thereof.

6. A rotary electric machine according to claim 1, wherein a circumferential position of the first crank portion of the first segment of each of the sets and that of the second crank portion of the second segment of each of the sets are substantially equal to each other.

7. A rotary electric machine according to claim 1, wherein the paired slant portions of each of the first and second segments of each of the sets have a same length.

8. A rotary electric machine according to claim 1, wherein each of the first and second crank portions is composed of a conductor segment with a substantially U-shaped turn section and a bent portion formed in part of the U-shaped turn section, the bent portion of each of the first and second crank portions being formed by deforming the part of the U-shaped turn section in a direction substantially perpendicular to an extending direction of the U-shaped turn section.

9. A rotary electric machine according to claim 8, wherein the straight portions of each of the first and second segments of each of the sets are aligned in the circumferential direction of the stator core, an alignment of the straight portions of each of the first and second segments of each of the sets in the circumferential direction of the stator core being formed by circumferentially simultaneously twisting the paired straight portions of each of the first and second segments.

10. A rotary electric machine according to claim 1, wherein the turn portion of each of the first and second segments of each of the sets continuously connects the paired straight conductor portions of each of the sets without being twisted.

11. A stator coil for rotary electric machines comprising:
a plurality of sets of at least first and second segments each having a substantially U- shape, the second segment being larger than the first segment, each of the first and second segments including:
a pair of straight conductor portions; and
a turn portion continuously connecting the paired straight conductor portions, one of the paired straight portions of each of the first and second segments of each of the sets being to be inserted into one of a plurality of slots formed in a stator core at predetermined pitches in a circumferential direction of the stator core, the other of the paired straight portions being to be inserted into another one of the slots of the stator core such that the second segment overlays the first segment, the turn portion of the first segment of each of the sets including a pair of slant portions configured to continuously extend from the paired straight portions, and a tip portion continuously joining the paired slant portions, the tip portion including a first crank portion, the first crank portion being configured to radially shift one of the paired slant portions from the other of the paired slant portions by a first length such that:
the first surface of the single wire conductor, constituting one surface of each of the paired slant portions and the tip portion of the first segment, is arranged to face the stator core, and
the second surface of the single wire conductor, constituting the other surface of each of the paired slant portions and the tip portion of the first segment, is arranged opposing the first surface,
the turn portion of the second segment of each of the sets including a pair of slant portions configured to continuously extend from the paired straight portions thereof, and a tip portion continuously joining the paired slant portions thereof, the tip portion including a second crank portion, the second crank portion being configured to radially shift one of the paired slant portions from the other of the paired slant portions by a second length such that:
the first surface of the single wire conductor, constituting one surface of each of the paired slant portions and the tip portion of the second segment, is arranged to face the stator core,
the second surface of the single wire conductor, constituting the other surface of each of the paired slant portions and the tip portion of the second segment, is arranged opposing the first surface,
the first length being substantially equivalent to a radial width of the turn portion of the first segment of each of the sets, the second length being determined to allow the second crank portion of the second segment of each of the sets to substantially overlay the first crank portion of the first segment of each of the sets,
wherein the first crank portion of the first segment of each of the sets has a first inclination with respect to a corresponding radial direction of the stator coil and the second crank portion of the second segment of each of the sets has a second inclination with respect to a corresponding radial direction of the stator coil, the first inclination being identical to the second inclination.

* * * * *

UNITED STATES PATENT AND TRADEMARK OFFICE
CERTIFICATE OF CORRECTION

PATENT NO. : 7,923,884 B2
APPLICATION NO. : 11/281513
DATED : April 12, 2011
INVENTOR(S) : Masahiro Seguchi et al.

It is certified that error appears in the above-identified patent and that said Letters Patent is hereby corrected as shown below:

Delete Title Page, and substitute with new Title Page (attached).

Please replace the informal drawing Figs. 1-26 with the attached formal drawing Figs. 1-26.

Signed and Sealed this
Twenty-eighth Day of June, 2011

David J. Kappos
*Director of the United States Patent and Trademark Office*

(12) United States Patent
Seguchi et al.

(10) Patent No.: US 7,923,884 B2
(45) Date of Patent: Apr. 12, 2011

(54) ROTARY ELECTRIC MACHINE HAVING STATOR COIL WITH U-SHAPED SEGMENT

(75) Inventors: Masahiro Seguchi, Oobu (JP); Shinji Kouda, Kariya (JP); Tetsuya Gorohata, Anjo (JP)

(73) Assignee: Denso Corporation, Kariya (JP)

(*) Notice: Subject to any disclaimer, the term of this patent is extended or adjusted under 35 U.S.C. 154(b) by 673 days.

(21) Appl. No.: 11/281,513

(22) Filed: Nov. 18, 2005

(65) Prior Publication Data

US 2006/0103255 A1 May 18, 2006

(30) Foreign Application Priority Data

Nov. 18, 2004 (JP) ................... 2004-334155

(51) Int. Cl.
*H02K 3/48* (2006.01)
*H02K 3/12* (2006.01)
*H02K 9/00* (2006.01)

(52) U.S. Cl. ........................... 310/201; 310/180
(58) Field of Classification Search .......... 310/201, 310/179, 180
See application file for complete search history.

(56) References Cited

U.S. PATENT DOCUMENTS

| | | | |
|---|---|---|---|
| 5,955,810 A * | 9/1999 | Umeda et al. | 310/208 |
| 6,252,326 B1 * | 6/2001 | Umeda et al. | 310/179 |
| 6,404,091 B1 * | 6/2002 | Nakamura et al. | 310/179 |
| 6,441,527 B1 | 8/2002 | Taji et al. | |
| 6,762,528 B2 * | 7/2004 | Wada et al. | 310/201 |
| 6,784,583 B2 * | 8/2004 | Umeda | 310/179 |
| 2004/0164637 A1 | 8/2004 | Seguchi | |
| 2006/0006757 A1 | 1/2006 | Seguchi | |
| 2006/0103255 A1 * | 5/2006 | Seguchi et al. | 310/201 |

FOREIGN PATENT DOCUMENTS

| | | |
|---|---|---|
| JP | A 2001-231203 | 8/2001 |
| JP | A 2003-018778 | 1/2003 |
| JP | A 2003-158840 | 5/2003 |
| JP | A 2003-264964 | 9/2003 |
| JP | A-2003-297863 | 10/2003 |
| JP | A-2004-112890 | 4/2004 |
| JP | A-2004-264964 | 9/2004 |
| JP | A 2004-297863 | 10/2004 |

OTHER PUBLICATIONS

Foreign Office Action, dated Apr. 7, 2009 (with English translation).
English-language translation of Japanese Office Action from Japanese Application No. 2004-334155, mailed Jun. 30, 2010.

* cited by examiner

*Primary Examiner* — Karl I Tamai
(74) *Attorney, Agent, or Firm* — Oliff & Berridge, PLC

(57) ABSTRACT

In a stator coil of a rotary electric machine, a first crank portion radially shifts one side of a turn portion from the other side thereof by a first length. The one side extends to one of paired straight portions, and the other side extends to the other thereof. A second crank portion radially shifts one side of a turn portion from the other side thereof by a second length. The one side extends to one of the paired straight portions, and the other side extends to the other thereof. The first length is equivalent to a radial width of the turn portion of the first segment of each set. The second length allows the second crank portion of the second segment of each of the sets to substantially overlay the first crank portion of the first segment of each set.

11 Claims, 16 Drawing Sheets

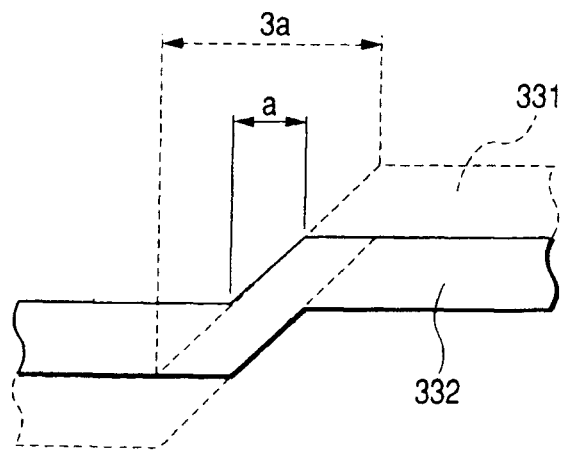

CIRCUMFERENTIAL DIRECTION